(12) United States Patent
Hinohara et al.

(10) Patent No.: US 11,416,202 B2
(45) Date of Patent: Aug. 16, 2022

(54) COMMUNICATION TERMINAL, COMMUNICATION SYSTEM, METHOD OF SHARING DATA, AND RECORDING MEDIUM

(71) Applicants: Hiroshi Hinohara, Kanagawa (JP); Shigeru Nakamura, Kanagawa (JP); Yuichi Kawasaki, Kanagawa (JP); Masashi Ogasawara, Tokyo (JP); Takeshi Homma, Kanagawa (JP); Atsushi Miyamoto, Kanagawa (JP)

(72) Inventors: Hiroshi Hinohara, Kanagawa (JP); Shigeru Nakamura, Kanagawa (JP); Yuichi Kawasaki, Kanagawa (JP); Masashi Ogasawara, Tokyo (JP); Takeshi Homma, Kanagawa (JP); Atsushi Miyamoto, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 16/989,889

(22) Filed: Aug. 11, 2020

(65) Prior Publication Data
US 2021/0055904 A1    Feb. 25, 2021

(30) Foreign Application Priority Data
Aug. 19, 2019    (JP) .............................. JP2019-149693

(51) Int. Cl.
*G06F 3/01* (2006.01)
*G06F 3/0488* (2022.01)
(Continued)

(52) U.S. Cl.
CPC .......... *G06F 3/1454* (2013.01); *G06F 3/0483* (2013.01); *G06F 3/04883* (2013.01);
(Continued)

(58) Field of Classification Search
CPC .. G06F 3/1454; G06F 3/04883; G06F 3/0483; G06F 3/0482; G06F 3/1423;
(Continued)

(56) References Cited

U.S. PATENT DOCUMENTS 8,504,624 B2 * 8/2013 Gormish ............ G06Q 10/0633
709/206
10,419,618 B2 * 9/2019 Kato ..................... H04L 65/403
(Continued)

FOREIGN PATENT DOCUMENTS

JP        2011-254453       12/2011
JP        2012-058799        3/2012
(Continued)

OTHER PUBLICATIONS

U.S. Appl. No. 16/802,586, filed Feb. 27, 2020 Yuuichi Kawasaki, et al.
(Continued)

*Primary Examiner* — Jordany Nunez
(74) *Attorney, Agent, or Firm* — Xsensus LLP

(57) ABSTRACT

A communication terminal includes circuitry to: transmit a participation request for requesting participation in a remote conference being conducted between one or more other communication terminals, to a communication management apparatus that manages data being shared between the other communication terminals; receive screen data of a display screen being currently displayed at the other communication terminals from the communication management apparatus, the screen data of the display screen being one of a plurality of items of screen data generated at at least one of the other communication terminals in the remote conference; and control a display to display the display screen based on the screen data that is received.

16 Claims, 25 Drawing Sheets

(51) Int. Cl.
*G06F 3/0482* (2013.01)
*G06F 3/14* (2006.01)
*H04L 12/18* (2006.01)
*H04N 7/15* (2006.01)
*G06F 3/0483* (2013.01)
*G06F 3/04883* (2022.01)

(52) U.S. Cl.
CPC ........... *H04L 12/1822* (2013.01); *H04N 7/15* (2013.01); *G06F 3/0482* (2013.01)

(58) Field of Classification Search
CPC .. H04N 7/15; H04L 12/1822; G09G 2340/12; G09G 2370/022; G09G 2370/20; G09G 2370/10; G09G 2340/14
See application file for complete search history.

(56) References Cited

U.S. PATENT DOCUMENTS

| | | | | |
|---|---|---|---|---|
| 2011/0057884 A1* | 3/2011 | Gormish | .................. | G06F 9/54 345/173 |
| 2011/0181619 A1* | 7/2011 | Kwon | ............... | H04M 1/72439 345/629 |
| 2013/0038676 A1 | 2/2013 | Tanaka et al. | | |
| 2015/0143261 A1 | 5/2015 | Marushima | | |
| 2015/0170326 A1 | 6/2015 | Tanaka et al. | | |
| 2015/0304416 A1* | 10/2015 | Higashi | .................. | H04L 67/06 709/217 |
| 2016/0036873 A1* | 2/2016 | Tonn | ..................... | H04L 51/046 709/205 |
| 2016/0253090 A1* | 9/2016 | Angelov | ................. | G06F 3/0447 715/863 |
| 2016/0316173 A1 | 10/2016 | Tanaka et al. | | |
| 2016/0366281 A1* | 12/2016 | Hamada | .................. | H04L 65/60 |
| 2017/0012793 A1* | 1/2017 | Morita | .................... | H04L 47/24 |
| 2017/0034477 A1* | 2/2017 | Morita | .................... | H04N 7/15 |
| 2018/0007317 A1 | 1/2018 | Tanaka et al. | | |
| 2019/0089928 A1 | 3/2019 | Tanaka et al. | | |
| 2020/0045265 A1 | 2/2020 | Tanaka et al. | | |
| 2020/0177742 A1 | 6/2020 | Homma et al. | | |

FOREIGN PATENT DOCUMENTS

| | | |
|---|---|---|
| JP | 2015-060592 | 3/2015 |
| JP | 2015-070543 | 4/2015 |
| JP | 2015-099424 | 5/2015 |

OTHER PUBLICATIONS

U.S. Appl. No. 16/808,411, filed Mar. 4, 2020 Takeshi Horiuchi, et al.

U.S. Appl. No. 16/816,260, filed Mar. 12, 2020 Hiroshi Hinohara, et al.

* cited by examiner

FIG. 8

Id : "sr003"
DistId : "pag01"
Operation Type : "Add"
Data Type : "Stroke"
Data : "(2,2), (2,4), (3,6), (2,9)"

FIG. 9A

| TERMINAL ID | PASSWORD |
|---|---|
| 01aa | aaaa |
| 01ba | baba |
| 01ca | caca |
| ... | ... |

FIG. 9B

| TERMINAL ID | DESTINATION NAME | OPERATING STATUS | TIME AND DATE OF RECEPTION | IP ADDRESS OF TERMINAL |
|---|---|---|---|---|
| 01aa | TERMINAL AA, TOKYO OFFICE, JAPAN | ONLINE (READY) | 2019.2.10.13.40 | 1.2.1.3 |
| 01ab | MR. AB, TOKYO OFFICE, JAPAN | ONLINE (COMMUICATING) | 2019.2.09.12.00 | 1.2.1.4 |
| 01ac | MR. AC, TOKYO OFFICE, JAPAN | OFFLINE | 2019.2.09.12.30 | 1.2.1.5 |
| ... | ... | ... | ... | ... |
| 01ba | TERMINAL BA, BEIJING OFFICE, CHINA | ONLINE (COMMUICATING) | 2019.2.10.13.45 | 1.2.2.3 |
| 01bb | MR. BB, BEIJING OFFICE, CHINA | ONLINE (SUSPENDED) | 2019.2.10.13.50 | 1.2.2.4 |
| ... | ... | ... | ... | ... |
| 01ca | TERMINAL CA, WASHINGTON, D.C. OFFICE, USA | OFFLINE | 2019.2.10.12.45 | 1.3.1.3 |
| 01cb | MR. CB, WASHINGTON, D.C. OFFICE, USA | ONLINE (COMMUICATING) | 2019.2.10.13.55 | 1.3.1.4 |
| ... | ... | ... | ... | ... |
| 01da | TERMINAL DA, BERLIN OFFICE, EUROPE | ONLINE (COMMUICATING) | 2019.2.08.12.45 | 1.3.2.3 |
| 01db | MR. DB, BERLIN OFFICE, EUROPE | ONLINE (COMMUICATING) | 2019.2.10.12.45 | 1.3.2.4 |
| ... | ... | ... | ... | ... |

FIG. 10A

| SOURCE TERMINAL ID | DESTINATION TERMINAL ID |
|---|---|
| 01aa | 01ab, ..., 01ba, 01bb, ..., 01ca, 01cb, 01da, 01db, ... |
| 01ab | 01aa, 01ca, 01cb, 01da |
| ... | ... |
| 01ba | 01aa, 01ab, 01ca, 01cb, 01da, 01db |
| ... | ... |
| 01ca | 01aa, 01ab, 01ba, ..., 01cb, ..., 01db |

FIG. 10B

| SESSION ID | RELAY DEVICE ID | SOURCE TERMINAL ID | DESTINATION TERMINAL ID | DELAY TIME | TIME AND DATE OF DELAY INFORMATION RECEPTION |
|---|---|---|---|---|---|
| se01 | 111a | 01aa | 01db | 200 | 2019.2.10.13:41 |
| se2 | 111a | 01ba | 01cb | 50 | 2019.2.10.12:01 |
| ... | ... | ... | ... | ... | ... |

FIG. 10C

| RELAY DEVICE ID | OPERATING STATUS | TIME AND DATE OF RECEPTION | IP ADDRESS OF RELAY DEVICE | MAXIMUM DATA TRANSMISSION RATE(Mbps) |
|---|---|---|---|---|
| 111a | ONLINE | 2019.2.10.13:00 | 1.2.1.2 | 100 |
| 111b | OFFLINE | 2019.2.10.13:10 | 1.2.2.2 | 1000 |
| 111c | ONLINE | 2019.2.10.13:20 | 1.3.1.2 | 100 |
| 111d | ONLINE | 2019.2.10.13:30 | 1.3.2.2 | 10 |

FIG. 11

SESSION ID ; se02

SESSION ID ; se01

| ID | SEQUENCE NUMBER | BODY | PARENT |
|---|---|---|---|
| se01 | 1 | children : pag01, pag02, pag03, pag04<br>current page : pag04 | -- |
| pag01 | 2 | IMAGE DATA URL ; http://XXX.jpeg | se01 |
| sr001 | 3 | COLOR(RGBA) : (0,0,0,0)<br>WIDTH(px) : 10px<br>VERTEX(x,y) : (0,0), (10,0), (20,1), (30,10) | pag01 |
| sr002 | 4 | COLOR(RGBA) : (128,0,0,0)<br>WIDTH(px) : 14px<br>VERTEX(x,y) : (10,50), (15,55), (16,40) | pag01 |
| ... | ... | ... | ... |
| pag02 | 12 | -- | se01 |
| sr010 | 13 | COLOR(RGBA) : (255,255,255,0)<br>WIDTH(px) : 10px<br>VERTEX(x,y) : (100,20), (110,30), (11,40) | pag02 |
| ... | ... | ... | ... |
| pag04 | 50 | IMAGE DATA URL ; http://YYY.jpeg | se01 |
| sr048 | 51 | COLOR(RGBA) : (255,255,128,0)<br>WIDTH(px) : 13px<br>VERTEX(x,y) : (57,60), (123,43) | pag04 |
| ... | ... | ... | ... |

FIG. 13

| STATUS | TERMINAL ID | DESTINATION NAME |
|---|---|---|
| 📞 | 01ab | MR. AB, TOKYO OFFICE, JAPAN |
| 📞 | 01ac | MR. AC, TOKYO OFFICE, JAPAN |
| ⋮ | | |
| 📞 | 01db | MR. DB, BERLIN OFFICE, EUROPE |
| ⋮ | | |

800

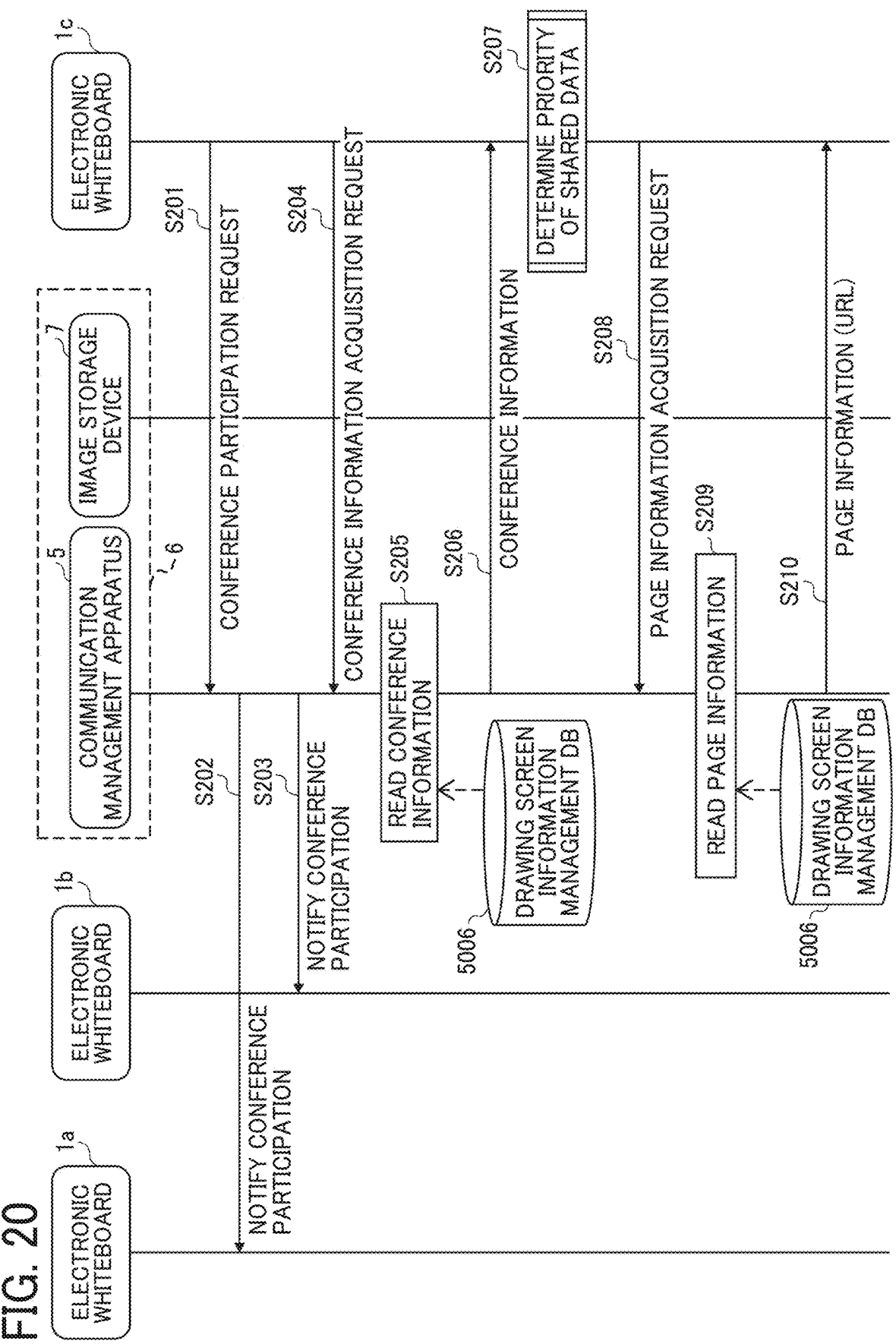

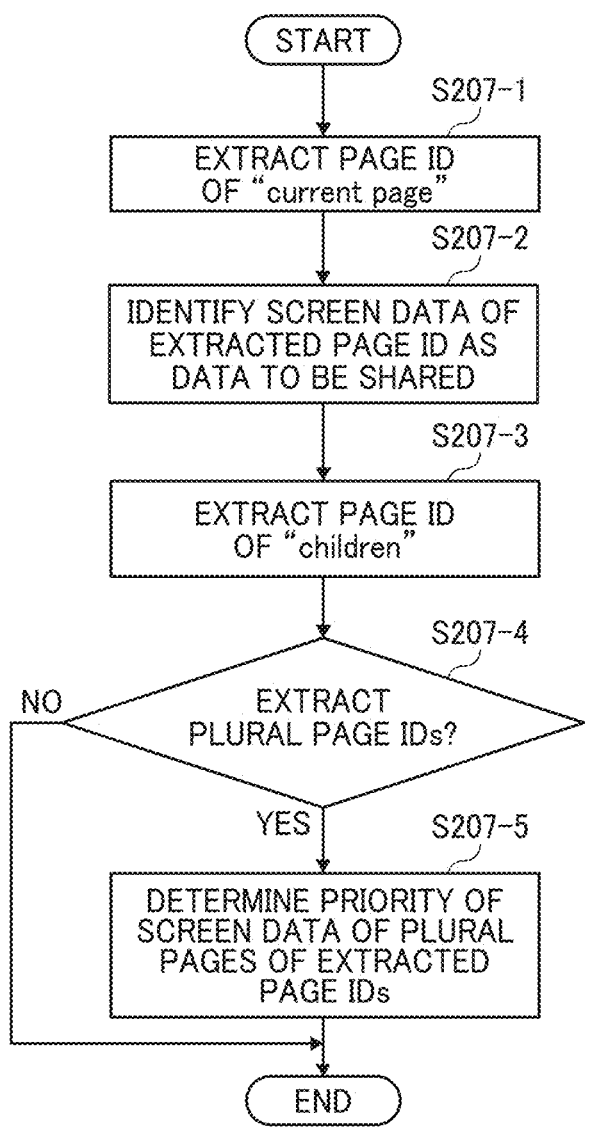

COMMUNICATION TERMINAL, COMMUNICATION SYSTEM, METHOD OF SHARING DATA, AND RECORDING MEDIUM

CROSS-REFERENCE TO RELATED APPLICATIONS

This patent application is based on and claims priority pursuant to 35 U.S.C. § 119(a) to Japanese Patent Application No. 2019-149693, filed on Aug. 19, 2019, in the Japan Patent Office, the entire disclosure of which is hereby incorporated by reference herein.

BACKGROUND

Technical Field

The present disclosure relates to a communication terminal, a communication system, a method of sharing data, and a recording medium.

Discussion of the Background Art

Communication systems are now in widespread use, which allow communication terminals at remote locations to communicate through a communication network such as the Internet. Examples of communication system include a conference system that performs a video conference. In general, a communication terminal operated by one party in the video conference transmits image data being held or displayed at the communication terminal to other communication terminal operated by other party through a communication network, to cause the image data to be shared between the communication terminals. This enables to carry out a video conference between remote locations, in a manner similar to an actual conference.

Furthermore, in recent years, communication terminals such as electronic whiteboards are widely used in companies, educational institutions, or government institutions. The electronic whiteboards display an image on a display and allows users to draw stroke images such as text, numbers, figures, or the like on the image. The communication terminal electronically converts content drawn by a user's operating of touching and moving an electronic pen or the user's hand on a surface of a display of the communication terminal, to generate stroke data such as coordinate data. The stroke image is rendered based on the stroke data. When a stroke image is drawn on one communication terminal, stroke data for reproducing the stroke image is transmitted to the other communication terminal through a communication network. The other communication terminal displays the same stroke image based on the received stroke data.

If a video conference is being held with other communication terminals, and there is a large amount of data to be shared, it will take time for all data to be shared with a communication terminal that joins the video conference part way. Therefore, in the conventional method, the user of the communication terminal that joins part way can hardly know the content of the conference that is currently discussed. This may degrade smoothness of communication between the user of the communication terminal and the user of the counterpart communication terminal.

SUMMARY

Example embodiments include a communication terminal including circuitry to: transmit a participation request for requesting participation in a remote conference being conducted between one or more other communication terminals, to a communication management apparatus that manages data being shared between the other communication terminals; receive screen data of a display screen being currently displayed at the other communication terminals from the communication management apparatus, the screen data of the display screen being one of a plurality of items of screen data generated at at least one of the other communication terminals in the remote conference; and control a display to display the display screen based on the screen data that is received.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 8 is a schematic diagram illustrating an example operation information stored in an operation information management database, according to the embodiment;

FIG. 9A is a conceptual diagram illustrating an example of an authentication management table, according to the embodiment;

FIG. 9B is a conceptual diagram illustrating an example of a terminal management table, according to the embodiment;

FIG. 10A is a conceptual diagram illustrating an example of a destination list management table, according to the embodiment;

FIG. 10B is a conceptual diagram illustrating an example of a session management table, according to the embodiment;

FIG. 10C is a conceptual diagram illustrating an example of a relay device management table, according to the embodiment;

FIG. 11 is a conceptual diagram illustrating an example of a drawing screen information management table, according to the embodiment;

FIG. 13 is a diagram illustrating an example of a destination list screen displayed on the electronic whiteboard;

FIG. 20 is a sequence diagram illustrating operation of sharing data with a communication terminal that joins part way through an on-going remote conference, in the communication system, according to the embodiment;

FIG. 22 is a flowchart illustrating example processing of determining a priority in data to be shared at the electronic whiteboard.

Figure 1:
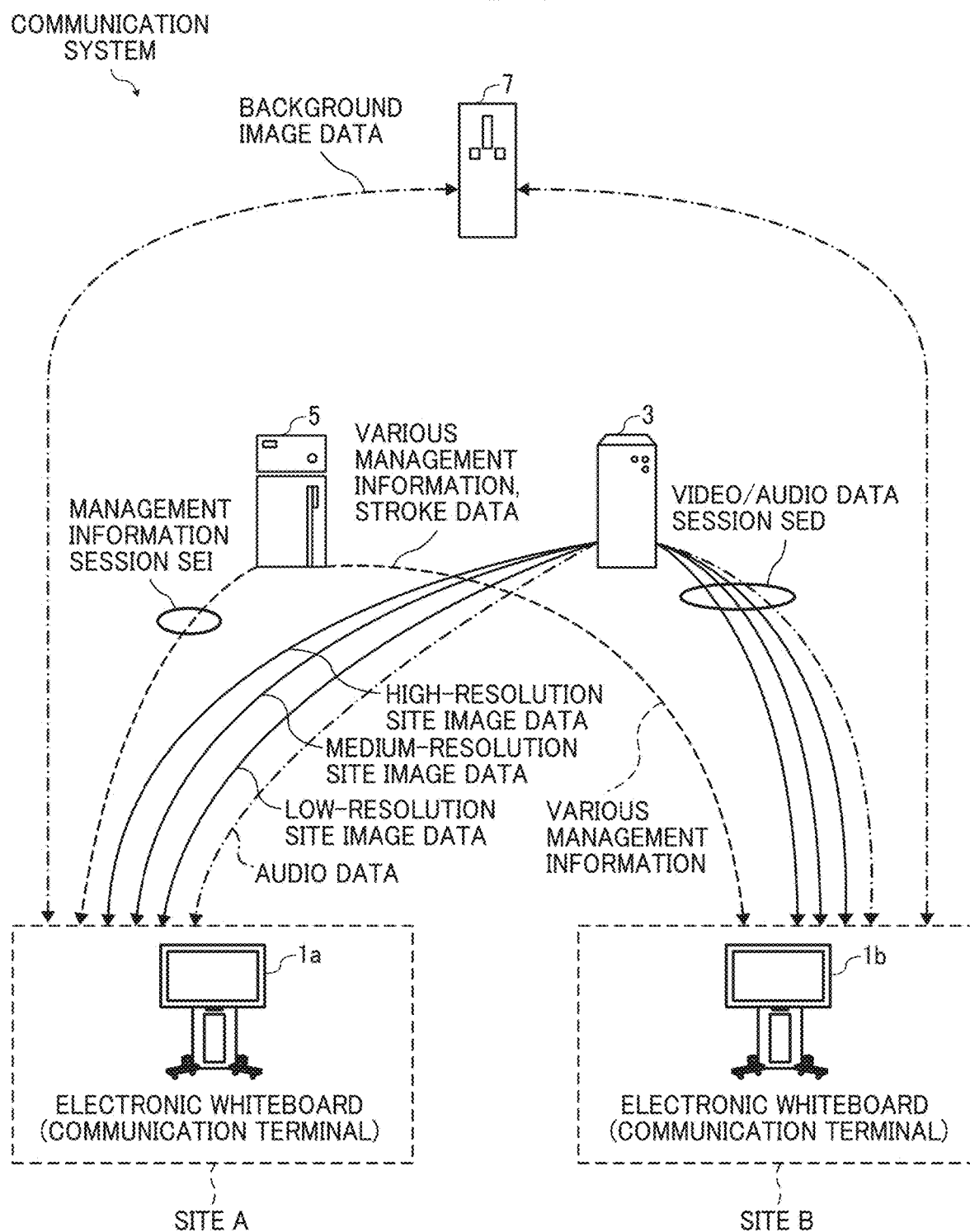
FIG. 1 is a schematic diagram illustrating an example of communication routes in a communication system, according to an embodiment.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Embodiments of the present invention are described with reference to the drawings. In the description of the drawings, the same elements are denoted by the same reference numerals, and redundant descriptions thereof are omitted.

Overview of Communication System:

Communication Route:

A communication system for conducting a video conference between a plurality of electronic whiteboards including an electronic whiteboard 1a and an electronic whiteboard 1b while allowing a user to draw images on the electronic whiteboards is described with reference to FIG. 1. FIG. 1 is a diagram illustrating an example of a communication route in the communication system according to an embodiment. In this disclosure, the "video conference" is sometimes called a "teleconference" or "remote conference". The "video conference", "teleconference", or "remote conference" is an example of a session in which image data and stroke data are shared between a plurality of terminals. For example, the session in which image data and stroke data are shared may be a session other than a conference, such as a session in which a remote lesson, a remote medical examination, a meeting, or a casual conversation is performed. The session in which image data and stroke data are shared may be used to transmit information in one direction, for example, to present information.

The communication system includes a plurality of electronic whiteboards including the electronic whiteboards 1a and the electronic whiteboard 1b, a relay device 3, a communication management apparatus 5, and an image storage device 7. The electronic whiteboard 1a and the electronic whiteboard 1b perform mutual communication of image data and audio data for calls and content data such as image data and stroke data for sharing. The stroke data is data necessary for reproducing a stroke image. The stroke data includes coordinate data, line width data, line color data, vector data, and the like. The stroke data is transmitted or received as a character string serialized by the electronic whiteboards 1a and 1b. The electronic whiteboards 1a and the electronic whiteboard 1b exchange image data and audio data for a call with each other to reproduce an image and sound of a site where the communication counterpart resides, making a remote video call. In this disclosure, an image of a site where each of the plurality of electronic whiteboards such as the electronic whiteboard 1a and the electronic whiteboard 1b reside may be referred to as a "site image", hereinafter. Further, data for such site image may be referred to as "site image data".

The electronic whiteboard 1a and the electronic whiteboard 1b exchange image data of a background image to be shared, allowing participants using the communication system to share the same background image. The background image is an image displayed on the display of the electronic whiteboard 1. The background image includes, for example, an image of materials, in which an electronic file of meeting materials, etc. is displayed on a display 180. The image data of the background image is transmitted and received in a file format such as JPEG (Joint Photographic Experts Group). Further, the electronic whiteboard 1a and the electronic whiteboard 1b exchange stroke data of a stroke image, allowing participants using the communication system to share the same stroke image. The stroke image is an image represented by a line or the like drawn by a user with a handwritten stroke with such as an electronic pen. The stroke image is displayed based on stroke data representing a point on a coordinate of the display.

Although in the example of FIG. 1, the communication system includes the two electronic whiteboards, i.e., the electronic whiteboard 1a and the electronic whiteboard 1b, in another example, the communication system may include three or more electronic whiteboards. The electronic whiteboard 1a and the electronic whiteboard 1b are collectively referred to as an "electronic whiteboard 1" or "electronic whiteboards 1" hereinafter, to simplify the description, unless they need to be distinguished from one to another. The electronic whiteboard 1 is an example of a communication terminal having a communication function, a drawing function, a display function, and the like. Other examples of the communication terminal include a PC, a smartphone, a tablet terminal, a smartwatch, a car navigation system, a game machine, or a telepresence robot, each of which is installed with application program corresponding the communication system. Further, the communication terminal includes a medical device. In a case where the communication terminal is a medical device, the background image is a patient image.

FIG. 1 illustrates an electronic whiteboard equipped with a videoconferencing function as an example of the electronic whiteboard 1a and the electronic whiteboard 1b. A site image based on site image data can be either a moving image or a still image.

In this disclosure, an electronic whiteboard that sends a request for starting a video conference is referred to as a "source terminal", and an electronic whiteboard as a request destination to which the request is to be transmitted is referred to as a "destination terminal". In FIG. 1, the electronic whiteboard 1a is the source terminal and the electronic whiteboard 1b is the destination terminal. When the start of the video conference is requested from the electronic whiteboard 1b, the electronic whiteboard 1b is the source terminal and the electronic whiteboard 1a is the destination terminal. Note that the electronic whiteboard 1a and the electronic whiteboard 1b may be used not only for communication between different offices or for communication between different rooms in the same office, but also for communication within the same room or for outdoor-indoor communication or outdoor-outdoor communication.

The relay device 3, which is implemented by one or more computers, performs a process of relaying content data for a call between the electronic whiteboard 1a and the electronic whiteboard 1b.

The communication management apparatus 5 is implemented by one or more computers. The communication management apparatus 5 centrally controls login authentication from the electronic whiteboard 1a and the electronic whiteboard 1b, the communication status of each of the electronic whiteboard 1a and the electronic whiteboard 1b, a destination list, the communication status of the relay device 3, and the like. Further, the communication management apparatus 5 relays stroke data to be shared between the electronic whiteboard 1a and the electronic whiteboard 1b.

The image storage device 7, which is implemented by one or more computers, stores image data of a background image to be shared. The background image is uploaded from the electronic whiteboard 1a, and is downloaded to the electronic whiteboard 1b. Alternatively, the background image may be uploaded from the electronic whiteboard 1b, and is downloaded to the electronic whiteboard 1a. In other words, the image storage device 7 stores the image data uploaded from the electronic whiteboard 1b, which is to be downloaded to the electronic whiteboard 1a.

In one example, each of the relay device 3, the communication management apparatus 5, and the image storage device 7 is configured as a single computer. In another example, each of the relay device 3, the communication management apparatus 5, and the image storage device 7 is configured as a plurality of computers to which one or more units (functions, means, or storages) are arbitrarily allocated. In other words, each of the relay device 3, the communication management apparatus 5, and the image storage device 7 can be implemented by a plurality of servers that operate in cooperation with one another. In this example, the communication management apparatus 5 and the image storage device 7 is configured as a server system 6 that controls data to be shared the electronic whiteboard 1a and the electronic whiteboard 1b. In the server system 6, the communication management apparatus 5 and the image storage device 7 may be configured as a single computer having one or more units (functions or means). In alternative to the communication management apparatus 5, the image storage device 7 may operate to relay stroke data to be shared between the electronic whiteboard 1a and the electronic whiteboard 1b.

In the communication system of FIG. 1, a management information session sei for exchanging various types of management information is established between the electronic whiteboard 1a and the electronic whiteboard 1b through the communication management apparatus 5. In addition, four sessions are established between the electronic whiteboard 1a and the electronic whiteboard 1b to exchange four types of data including site image data of high resolution, site image data of medium resolution, site image data of low resolution, and audio data, through the relay device 3. In FIG. 1, these four sessions are collectively referred to as a video and audio data session sed. While video data is communicated in this example, still image data may be communicated. Note that the video and audio data session sed does not necessarily have to be four sessions and may have a smaller or larger number of sessions than the four sessions. In addition, a communication session may be established directly between the source terminal and the destination terminal without intervening the relay device 3. In the communication system, the communication management apparatus 5 may have a function of the relay device 3, such that the image and audio data session sed may be established between the electronic whiteboard 1a and the electronic whiteboard 1b through the communication management apparatus 5.

Further, in the communication system of FIG. 1, stroke data is exchanged between the electronic whiteboard 1a and the electronic whiteboard 1b using the management information session sei.

The description is now given of the resolution of an image of the site image data handled in the present embodiment. For example, the site image data of low resolution consists of 160 pixels in the horizontal direction and 120 pixels in the vertical direction. Such site image data of the low resolution is a base image. The site image data of medium resolution consists of, for example, 320 pixels in the horizontal direction and 240 pixels in the vertical direction. The site image data of high resolution consists of, for example, 640 pixels in the horizontal direction and 480 pixels in the vertical direction. In the case of a narrow band path, low-quality image data that only includes the site image data of low resolution as a base image is relayed. In the case of a relatively wide band path, intermediate-quality image data including the site image data of low resolution as a base image and the site image data of medium resolution is relayed. In the case of a very wide band path, high-quality image data including the site image data of low resolution as a base image, the site image data of medium resolution, and the site image data of high resolution is relayed. Since audio data is relatively small in data size compared with the site image data, the audio data is relayed even in the case of a narrow band path.

Figure 2:
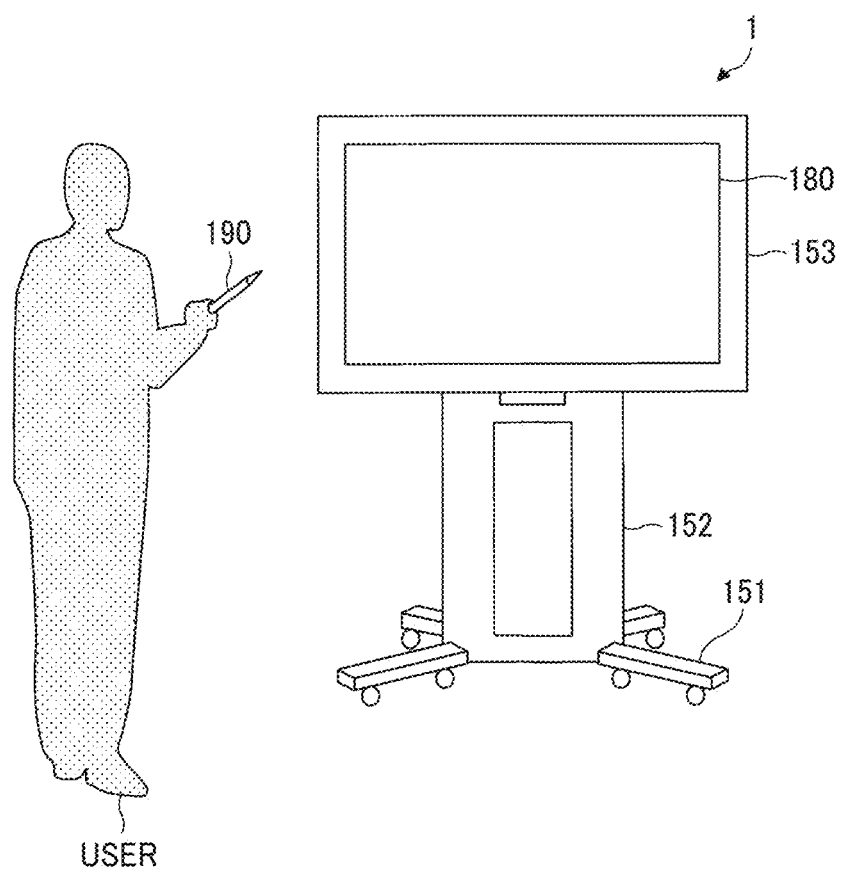
FIG. 2 is a diagram for describing how the electronic whiteboard is used according to the embodiment.

Use Scenario of Electronic Whiteboard:

FIG. 2 is a diagram for describing how the electronic whiteboard is used according to the embodiment. As illustrated in FIG. 2, the electronic whiteboard 1 includes a plurality of legs 151 each having a caster on the lower side, a support 152 provided on the upper side of the legs 151, a main body 153 provided on top of the support 152, and the display 180 provided on the front surface of the main body 153. The main body 153 includes a central processing unit (CPU) 101 and the like which is described below. The user can input (draw) a stroke image such as characters on the display 180 using an electronic pen 190. The display 180 is an example of a display (display device).

Hardware Configuration:

Next, a hardware configuration of each apparatus, device, or terminal of the communication system is described with reference to FIGS. 3 and 4. In the hardware configuration illustrated in FIG. 3 and FIG. 4, components or elements may be added or deleted as needed.

Figure 3:
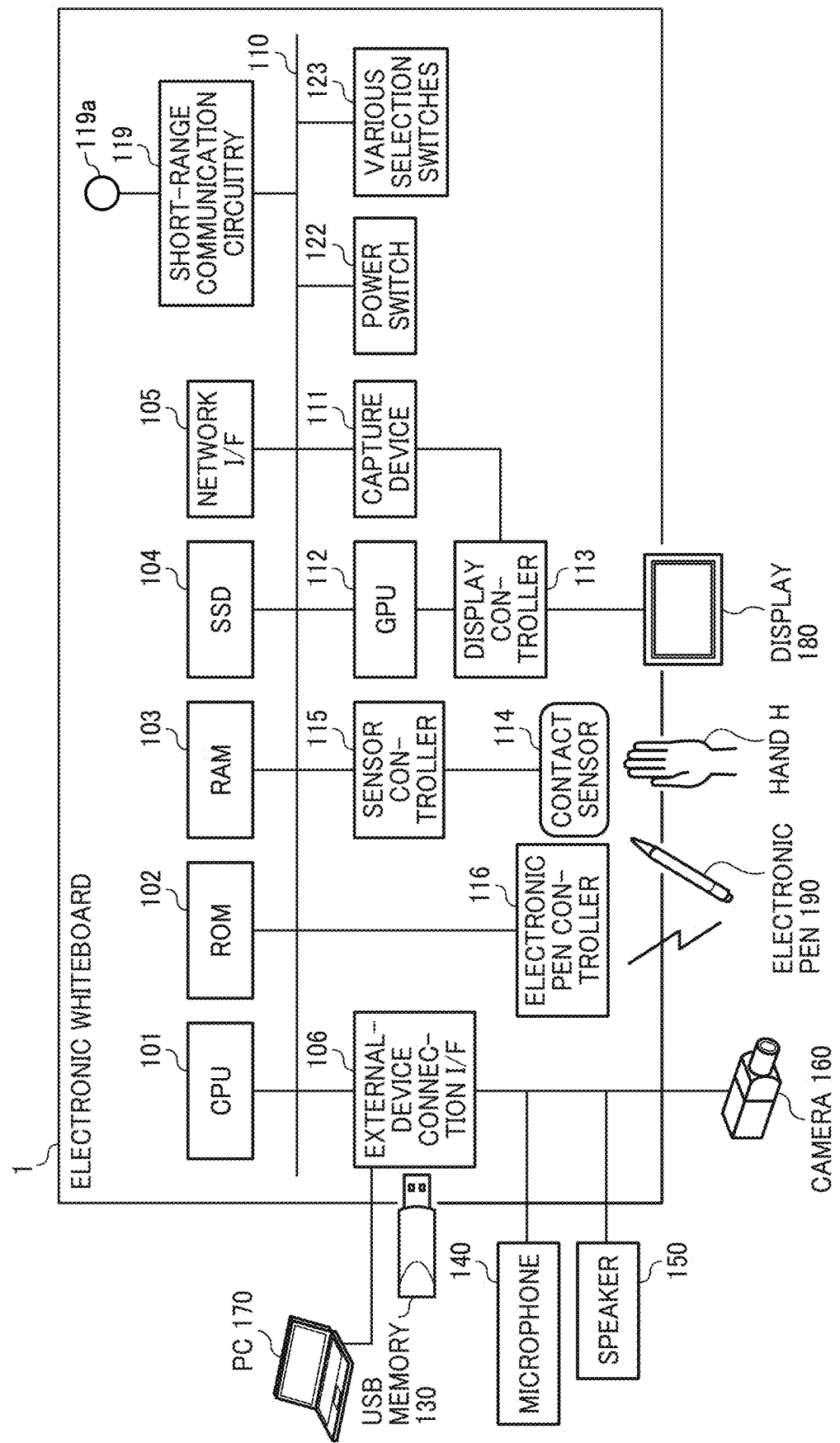
FIG. 3 is a block diagram illustrating an example hardware configuration of an electronic whiteboard according to the embodiment.

Hardware Configuration of Electronic Whiteboard:

FIG. 3 is a block diagram illustrating an example hardware configuration of an electronic whiteboard according to the embodiment. As illustrated in FIG. 3, the electronic whiteboard 1 includes a CPU 101, a read only memory (ROM) 102, a random access memory (RAM) 103, a solid state drive (SSD) 104, a network interface (I/F) 105, and an external device connection I/F 106.

The CPU 101 controls entire operation of the electronic whiteboard 1. The ROM 102 stores a control program for controlling the CPU 101 such as an initial program loader (IPL) to boot the CPU 101. The RAM 103 is a volatile memory used as a work area for the CPU 101. The SSD 104 is a large capacity storage device (memory) that stores various data such as a control program for the electronic whiteboard 1. The network I/F 105 is a communication interface that connects the electronic whiteboard 1 to connect to the communication network 100 to communicate with other apparatuses. The external device connection I/F 106 is an interface for connecting the electronic whiteboard 1 to various extraneous sources. Examples of the extraneous sources include a universal serial bus (USB) memory 130 and external devices (a microphone 140, a speaker 150, and a camera 160).

The electronic whiteboard 1 further includes a capture device 111, a graphics processing unit (GPU) 112, a display controller 113, a contact sensor 114, a sensor controller 115, an electronic pen controller 116, a short-range communication circuit 119, an antenna 119a for the short-range communication circuit (circuitry) 119, a power switch 122, and selection switches 123.

The capture device 111 displays image data (image information) as a still image or a moving image on a display of a computer (PC) 170, which is external to the electronic whiteboard 1. The GPU 112 is a semiconductor chip dedicated to processing of a graphical image. The display controller 113 controls display of screens to output an image output from the GPU 112 to the display 180 or the like. The contact sensor 114 detects a touch on the display 180 by the electronic pen 190 or a user's hand H. The sensor controller 115 controls operation of the contact sensor 114. The contact sensor 114 senses a touch input to a specific coordinate on the display 180 using the infrared blocking system. More specifically, the display 180 is provided with two light receiving elements disposed on both upper side ends of the display 180, and a reflector frame surrounding the sides of the display 180. The light receiving elements emit a plurality of infrared rays in parallel to a surface of the display 180. The light receiving elements receive lights passing in the direction that is the same as an optical path of the emitted infrared rays, which are reflected by the reflector frame. The contact sensor 114 outputs an identifier (ID) of the infrared ray that is blocked by an object (such as the user's hand) after being emitted from the light receiving elements, to the sensor controller 115. Based on the ID of the infrared ray, the sensor controller 115 detects a particular coordinate that is touched by the object. The electronic pen controller 116 communicates with the electronic pen 190 to detect a touch by the tip or bottom of the electronic pen 190 to the display 180. The short-range communication circuit 119 is a communication circuit that communicates in compliance with the near field communication (NFC), the Bluetooth (Registered Trademark), and the like. The power switch 122 turns on or off the power of the electronic whiteboard 1. The selection switches 123 are a group of switches for adjusting brightness, hue, etc., of display on the display 180, for example.

The electronic whiteboard 1 further includes a bus line 110. The bus line 110 is, for example, an address bus or a data bus, which electrically connects the elements such as the CPU 101 illustrated in FIG. 3.

The contact sensor 114 is not limited to the infrared blocking system type, and may be a different type of detector, such as a capacitance touch panel that identifies the contact position by detecting a change in capacitance, a resistance film touch panel that identifies the contact position by detecting a change in voltage of two opposed resistance films, or an electromagnetic induction touch panel that identifies the contact position by detecting electromagnetic induction caused by contact of an object to a display. In addition to or in alternative to detecting a touch by the tip or bottom of the electronic pen 190, the electronic pen controller 116 may also detect a touch by another part of the electronic pen 190, such as a part held by a hand of the user.

Figure 4:
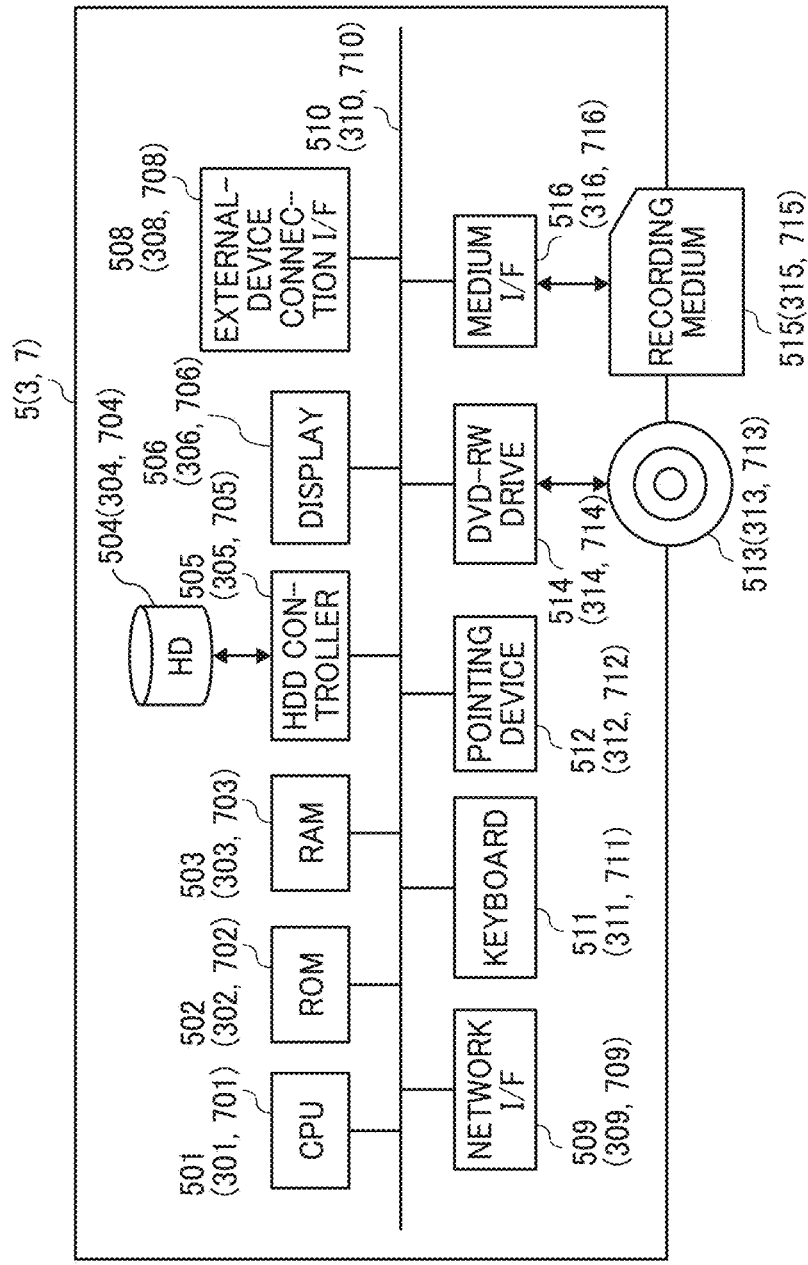
FIG. 4 is a block diagram illustrating an example of a hardware configuration of a communication management apparatus, a relay device, and an image storage device, according to the embodiment.

Hardware Configuration of Communication Management Apparatus, Relay Device, and Image Storage Device:

FIG. 4 is a block diagram illustrating an example of a hardware configuration of a communication management apparatus, a relay device, and an image storage device, according to an embodiment. The communication management apparatus 5 is implemented by, for example, one or more computers. The computer includes a CPU 501, a ROM 502, a RAM 503, a hard disk (HD) 504, a hard disk drive (HDD) controller 505, a display 506, an external device connection I/F 508, a network I/F 509, a keyboard 511, a pointing device 512, a digital versatile disc-rewritable (DVD-RW) drive 514, a medium I/F 516, and a bus line 510.

The CPU 501 controls entire operation of the communication management apparatus 5. The ROM 502 is a nonvolatile memory that stores a program for controlling the CPU 501, such as an initial program loader (IPL). The RAM 503 is a volatile memory used as a work area for the CPU 501. The HD 504 is a large capacity storage device (memory) that stores various data such as a communication control program. The HDD controller 505 controls reading or writing of various data to or from the HD 504 under control of the CPU 501. The display 506 displays various information such as a cursor, menu, window, characters, or image. The external device connection I/F 508 is an interface that connects the computer as the communication management apparatus 5 to various extraneous sources. The network I/F 509 is an interface for performing data communication using the communication network 100 such as the Internet. The keyboard 511 is one example of an input device (input means) provided with a plurality of keys for enabling a user to input characters, numerals, or various instructions. The pointing device 512 is an example of an input device (input means) that allows a user to select or execute a specific instruction, select a target for processing, or move a cursor being displayed. The DVD-RW drive 514 controls reading or writing (storing) of data to the DVD-RW 513. In another example, a DVD-R can be used as the removal storage medium, in alternative to the DVD-RW 513. In still another example, in alternative to or in addition to the DVD-RW drive 514, a Blu-ray (registered trademark) drive or a compact disc rewritable (CD-RW) drive are used to control reading or writing (storing) of data with respect to a Blu-ray disc rewritable (BD-RE) or a CD-RW. The medium I/F 516 controls reading or writing (storing) of data with respect to a storage medium 515 such as a flash memory. The bus line 510 is an address bus, a data bus or the like, which electrically connects the elements illustrated in FIG. 4 such as the CPU 501.

The relay device 3 is implemented by one or more computers. As illustrated in FIG. 6, the relay device 3 includes a central processing unit (CPU) 301, a read only memory (ROM) 302, a random access memory (RAM) 303, a hard disk (HD) 304, a hard disk drive (HDD) controller 305, a display 306, an external device connection interface (I/F) 308, network I/F 309, a bus line 310, a keyboard 311, a pointing device 312, a digital versatile disc rewritable (DVD-RW) drive 314 and a medium I/F 316. Since these elements are substantially similar to the CPU 501, the ROM 502, the RAM 503, the HD 504, the HDD controller 505, the display 506, the external device connection I/F 508, the network I/F 509, the bus line 510, the keyboard 511, the pointing device 512, the DVD-RW drive 514, and the medium I/F 516 of the communication management apparatus 5, redundant description thereof is omitted. The relay device 3, however, stores a relay control program in the HD 304 in alternative to the relay control program.

The image storage device 7 is implemented by one or more computers. As illustrated in FIG. 6, the image storage device 7 includes a CPU 701, a ROM 702, a RAM 703, a HD 704, a HDD controller 705, a display 706, an external device connection interface (I/F) 708, network I/F 709, a bus line 710, a keyboard 711, a pointing device 712, a DVD-RW drive 714 and a medium I/F 716. Since these elements are substantially similar to the CPU 501, the ROM 502, the RAM 503, the HD 504, the HDD controller 505, the display 506, the external device connection I/F 508, the network I/F 509, the bus line 510, the keyboard 511, the pointing device 512, the DVD-RW drive 514, and the medium I/F 516 of the communication management apparatus 5, redundant description thereof is omitted. In addition, the image storage device 7 stores an image storage control program in the HD 704 in alternative to the communication control program.

Further, any one of the above-described control programs may be recorded in a file in a format installable or executable on a computer-readable storage medium for distribution. Examples of the storage medium include, but not limited to, compact disc-recordable (CD-R), DVD, Blu-ray disc, and secure digital (SD) card. In addition, such storage medium may be provided in the form of a program product to users within a certain country or outside that country. For example, the communication terminal such as the electronic whiteboard 1 executes the control program to implement a data sharing method according to the present disclosure.

Figure 5:
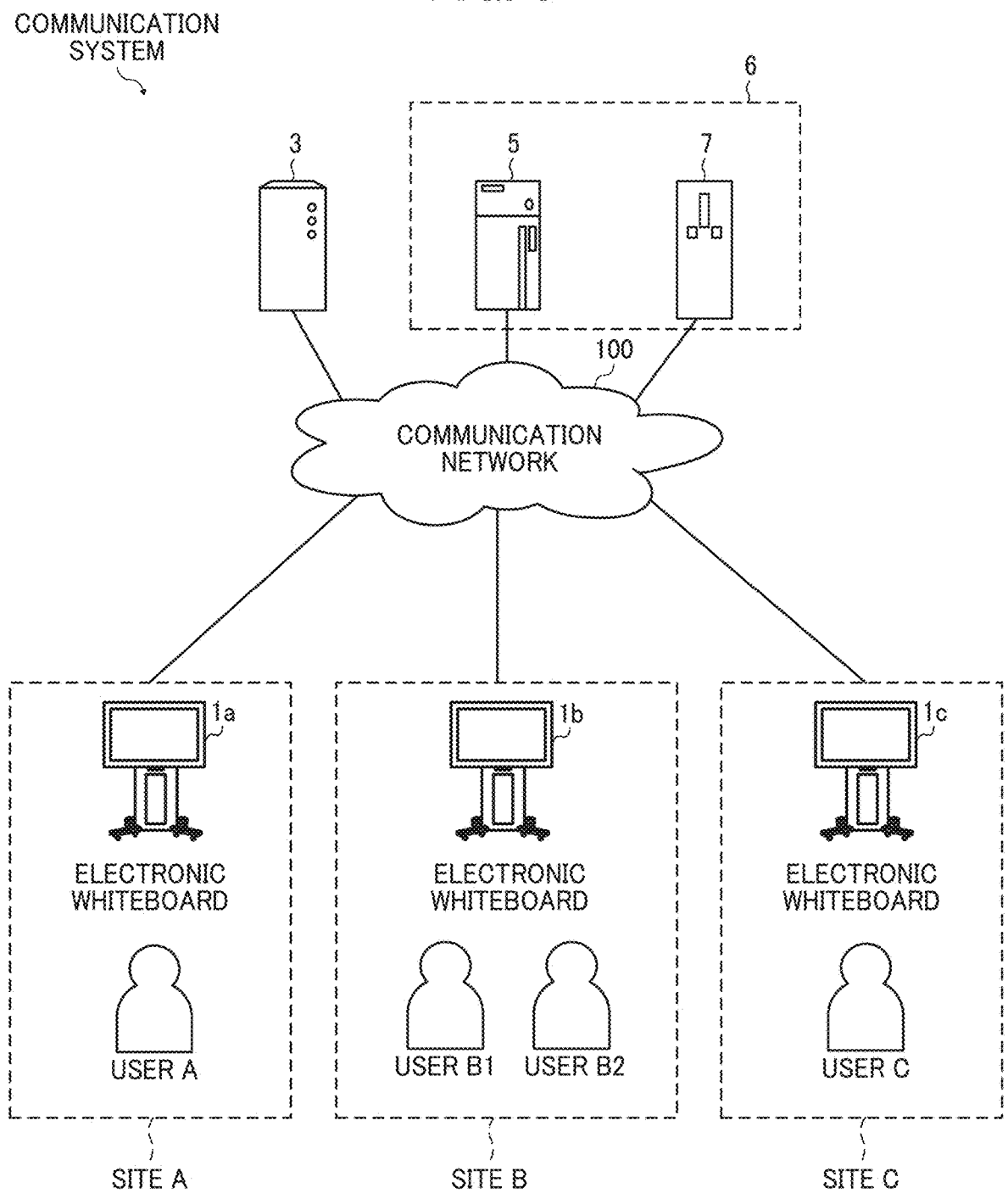
FIG. 5 is a diagram illustrating an example of a system configuration of the communication system, according to the embodiment.

Overview of Configuration of Communication System:

A description is now given of an overall configuration of the communication system with reference to FIG. 5, according to an embodiment. FIG. 5 is a diagram illustrating an example of a system configuration of the communication system, according to the embodiment.

In FIG. 5, the electronic whiteboard 1*a* is provided at a site A, the electronic whiteboard 1*b* is provided at a site B, and an electronic whiteboard 1*c* is provided at a site C. For example, the site A is a Tokyo office in Japan, the site B is a Beijing office in China, and the site C is a Washington D.C. office in the United States. Further, a user A1 uses the electronic whiteboard 1*a* at the site A, users B1 and B2 use the electronic whiteboard 1*b* at the site B, and a user C1 uses the electronic whiteboard 1*c* at the site C.

The electronic whiteboard 1*a*, the electronic whiteboard 1*b*, the electronic whiteboard 1*c*, the relay device 3, the communication management apparatus 5, and the image storage device 7 mutually communicate data through the communication network 100 such as the Internet or LAN. The communication network 100 may not only include a wired network, but also a wireless network such as a network in compliance with Wi-Fi (registered trademark) or the like.

Figure 6A:
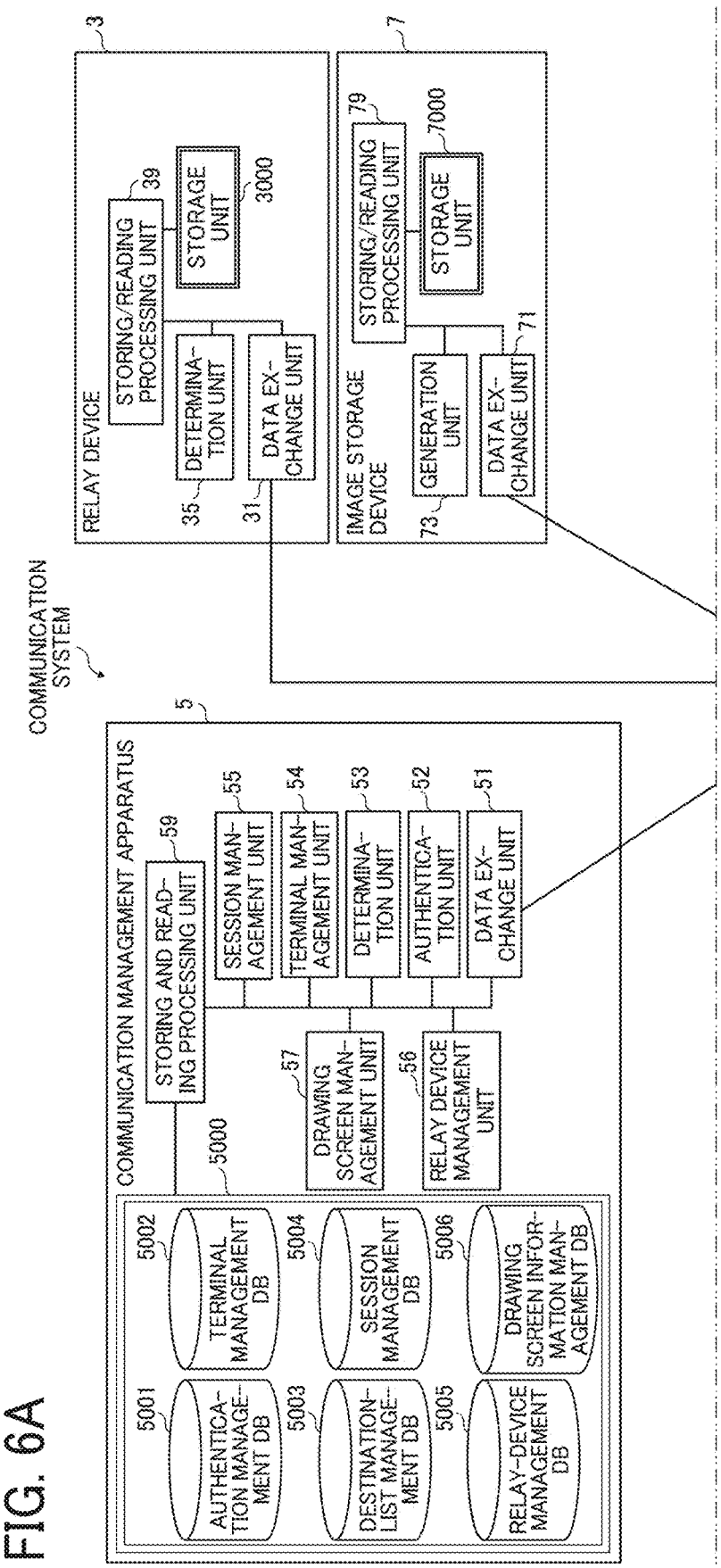
FIGS. 6A and 6B (FIG. 6) are a diagram illustrating an example of a functional configuration of the communication system according to the embodiment.
Figure 6B:
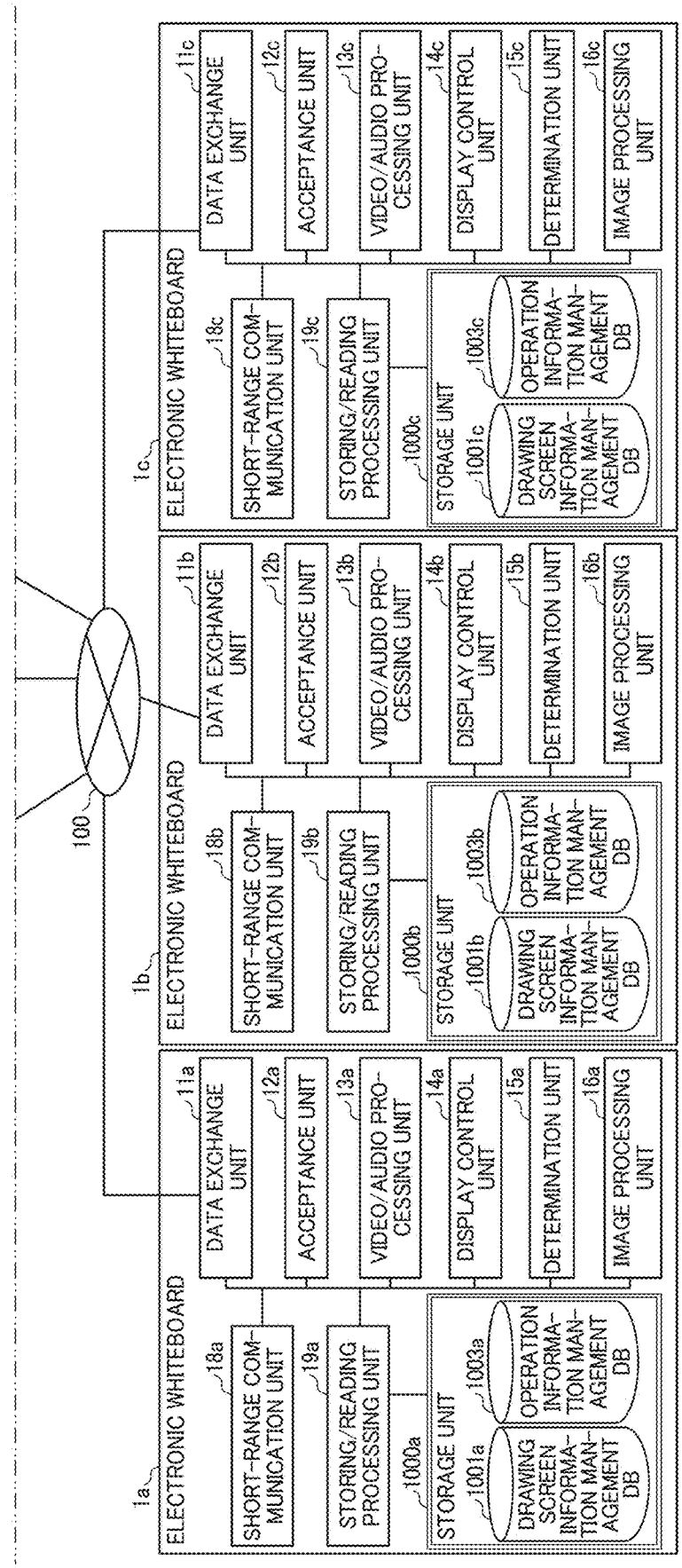

Functional Configuration of Communication System:

A description is now given of a functional configuration of the communication system according to embodiments, with reference to FIG. 6A to FIG. 11. FIG. 6 is a diagram illustrating an example of a functional configuration of the communication system according to the embodiment. FIG. 6 illustrates a terminal, an apparatus, and a server that relate to processes or operations to be described below among the terminals, apparatuses, and servers illustrated in FIG. 5.

Functional Configuration of Electronic Whiteboard:

First, a description is given of the functional configuration of the electronic whiteboard 1 according to the embodiment. Since the functions of the electronic whiteboards 1*a*, 1*b* and 1*c* are the same in this embodiment, the electronic whiteboards 1*a*, 1*b*, and 1*c* are collectively referred to as the electronic whiteboard 1. The electronic whiteboard 1 includes a data exchange unit 11, an acceptance unit 12, a video/audio processing unit 13, a display control unit 14, a determination unit 15, an image processing unit 16, a short-range communication unit 18, and a storing/reading processing unit 19. These units are functions implemented by or caused to function by operating any of the hardware elements illustrated in FIG. 3 in cooperation with the instructions of the CPU 101 according to the control program expanded from the SSD 104 to the RAM 103. The electronic whiteboard 1 further includes a storage unit 1000, which is implemented by the RAM 103, the SSD 104, or the USB memory 130 illustrated in FIG. 3.

The data exchange unit 11, which is implemented by instructions of the CPU 101 and by the network I/F 105 illustrated in FIG. 3, transmits or receives various types of data (or information) to or from other terminal, device, apparatus, or system through the communication network 100. The data exchange unit 11 also functions as a communication starting unit, for example, and performs a process of starting communication with other electronic whiteboard 1. For example, the data exchange unit 11 transmits or receives screen data to be used for such as drawing, to be displayed on the display 180 to or from other electronic whiteboard via the communication management apparatus 5. The screen data used for such as drawing (referred to as the drawing screen data) is screen data that allows a user to draw strokes, such that the screen data may include a stroke image. The data exchange unit 11 is an example of transmission means. Further, the data exchange unit 11 is an example of receiving means. Further, the data exchange unit 11 is an example of communication means. The acceptance unit 12, which is implemented by instructions of the CPU 101, by the contact sensor 114, and by the electronic pen controller 116 illustrated in FIG. 3, receives various inputs from the user, which is input with such as the electronic pen 190.

The video/audio processing unit 13 is implemented by instructions from the CPU 101 illustrated in FIG. 3, and performs processing to conduct video conference. For example, the video/audio processing unit 13 performs digital processing such as encoding of site image data and audio data in accordance with the output signal of the microphone 140 and the output signal of the camera 160. Further, the video/audio processing unit 13 generates an image signal and an audio signal based on the site image data and the audio data received at the data exchange unit 11. The video/audio processing unit 13 performs processing for combining site image data having different resolutions.

The display control unit 14 is implemented by instructions of the CPU 101 and by the display controller 113 illustrated in FIG. 3, and controls output of an image signal to the display 180, for example. For example, the display control unit 14 controls the display 180 to display a screen for drawing, based on drawing screen data generated at the image processing unit 16. The display control unit 14 is an example of display control means. The determination unit 15, which is implemented by instructions of the CPU 101 illustrated in FIG. 3, has a function of making various determinations. For example, the determination unit 15 identifies a screen for drawing, which is currently displayed at a particular electronic whiteboard 1, from among a plurality of items of screen data generated at the particular electronic whiteboard 1, based on conference data regarding a video conference transmitted from the communication management apparatus 5. The determination unit 15 is an example of identifying means.

The image processing unit 16 is implemented by instructions from the CPU 101 and the capture device 111 illustrated in FIG. 3, and performs processing related to functions of the electronic whiteboard. For example, the image processing unit 16 generates stroke data and a stroke image based on a stroke of the electronic pen 190 or the like, accepted by the acceptance unit 12a. Alternatively, the image processing unit 16 generates a stroke image based on stroke data received by the data exchange unit 11. Further, the image processing unit 16 generates, for example, drawing screen data including the generated stroke image.

The short-range communication unit 18, which is implemented by instructions of the CPU 101 and the short-range communication circuit 119 with the antenna 119a, illustrated in FIG. 3, communicates with a terminal device carried by the user, such as an IC card or a smartphone, to obtain or provide data from or to the IC card or the smartphone by short-range communication.

The storing/reading processing unit 19, which is implemented by instructions of the CPU 101 illustrated in FIG. 3, has a function of storing various data in the storage unit 1000, and reads various data from the storage unit 1000. Further, every time site image data and audio data are received in performing communication with other terminal, the storing/reading processing unit 19 overwrites the site image data and audio data stored in the storage unit 1000. The display 180 displays an image based on site image data before being overwritten. The speaker 150 outputs sound based on audio data before being overwritten. The storage unit 1000 further stores stroke data corresponding to a stroke image drawn on the display 180 and background image data corresponding to a background image displayed on the display 180.

Figure 7:
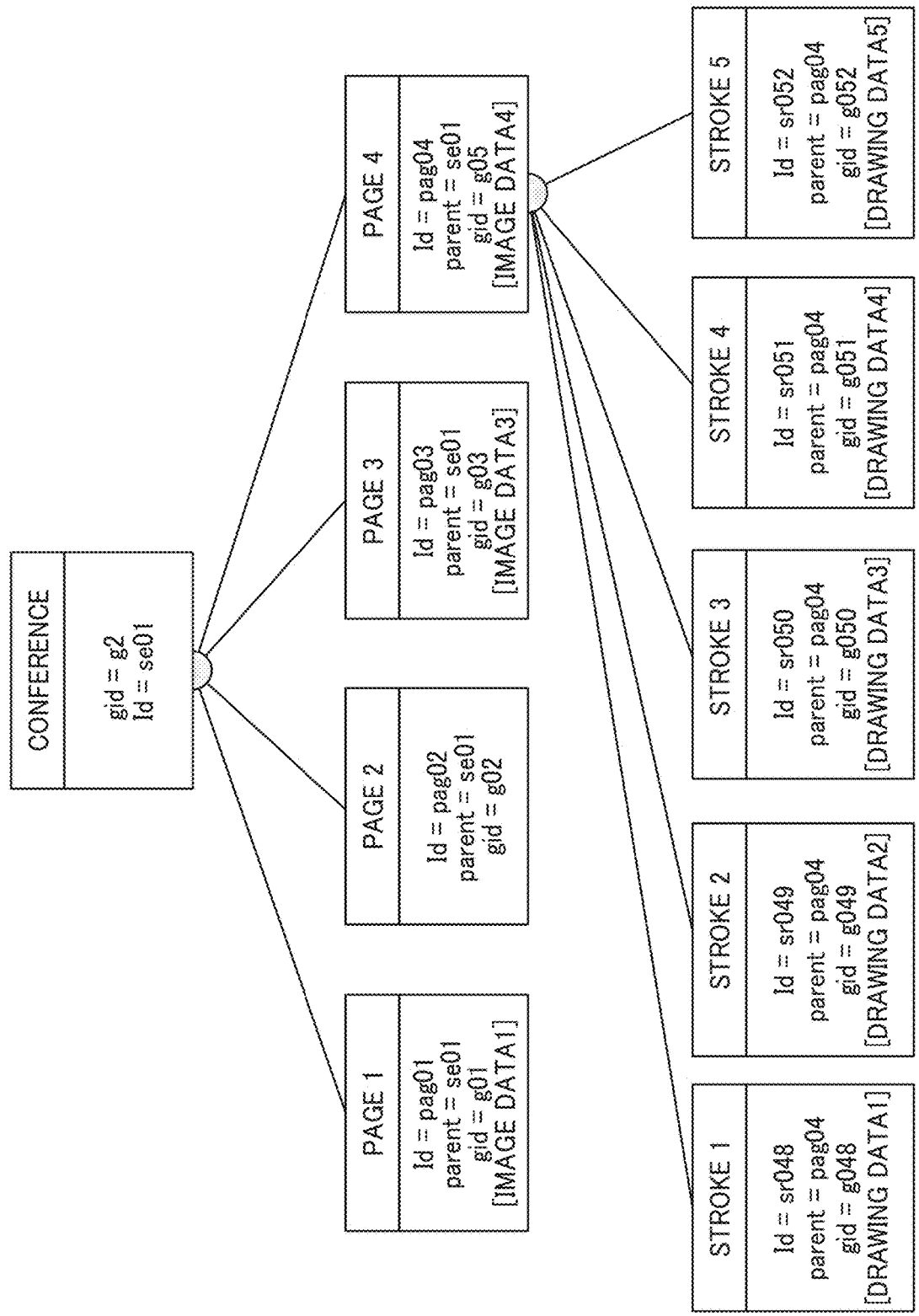
FIG. 7 is a schematic diagram illustrating an example of drawing screen information according to the embodiment.

Drawing Screen Information:

FIG. 7 is a schematic diagram illustrating an example of drawing screen information according to the embodiment. FIG. 7 illustrates an example image of a drawing screen displayed on the electronic whiteboard 1, based on information stored in the drawing screen management DB 1001.

As illustrated in the example of FIG. 7, the drawing screen image has a hierarchical structure, classified by "conference", "page (pages 1 to 4)", and "stroke (strokes 1 to 5)". The "stroke" corresponds to stroke data in this embodiment, and is managed for each "page". The "page" represents a one-page screen (display screen) to be displayed on the display 180. The "conference" represents information on a conference being conducted using the electronic whiteboard 1. For example, the stroke 1 includes a stroke ID (id=sr048) for identifying the stroke 1, information (parent=pag04) for identifying a page 1 as a parent (root), gid "g048" for identifying drawing data 1, and drawing data 1, etc. For example, when operation such as movement is performed on the stroke image represented by the stroke 1, the stroke ID (id=sr048) is inherited as it is, but the gid "g048" for identifying the drawing data 1, and the drawing data 1 are each updated. The drawing data 1 is drawing data for reproducing the stroke 1. The drawing data 1 includes, for example, coordinate data, line width data, line color data, vector data, and the like.

The electronic whiteboard 1 can switch from one page to other page, and the "page" corresponds to each page of screen available for display at the electronic whiteboard 1. For example, the page 1 includes a page ID (id=pag01) for identifying page 1, information (parent=se01) for identifying a "conference" as a parent (root), and gid "g01" for identifying a page (page data), and image data 1, etc. The image data 1 is image data of a background image constituting the page 1. That is, the image data 1 represents the background image displayed on the page 1. In this example, the page 2 does not include image data. This means that the page 2 has no background image (or a blank background).

The "conference" corresponds to a session managed by the communication system, and is managed using, for example, a session ID (id=se01) for identifying each session. For example, the image processing unit 16 of the electronic whiteboard 1 can generate the stroke image drawn on the page 4 by using the drawing data 1 to 5 included in the strokes 1 to 5, respectively.

Operation Information:

Referring to FIG. 8, operation information indicating operation on a drawing screen at the electronic whiteboard 1, is described according to the embodiment. FIG. 8 is a schematic diagram illustrating an example operation information according to the embodiment. The operation information illustrated in FIG. 8 stores information regarding operations performed on the drawing screen displayed at the electronic whiteboard 1. The operation information illustrated in FIG. 8 includes a stroke ID (Id) for identifying stroke data of a stroke, a page ID (DistId) for identifying a page on which a stroke is drawn, operation type information (Operation Type) indicating a type of operation on the drawing screen, data type information (Data Type) indicating a type of data to be operated, and data specific information (Date) regarding the content of the data to be operated.

The operation type information indicates a type of operation performed by a user on the stroke or page included in the drawing screen. For example, when the operation target is a stroke, the operation type information indicates "Add" when the stroke is drawn, "Remove" when the stroke is deleted, and "Update" when the stroke is moved. Further, the data type information indicates "Stroke" when the operation target is a stroke, and "Page" when the operation target is a page. Further, when the operation target is a stroke, the data specific information represents the stroke data, and includes information such as coordinate data, line width data, and line color data. The data specific information corresponds to the body information illustrated in the drawing screen information management table (see FIG. 11) described later.

In this example, the data to be operated is not limited to one stroke or one page, but may be an object as a collection of a plurality of strokes. Such object includes texts obtained by applying OCR (Optical Character Reader) processing to strokes representing symbols such as characters or numbers, system generated characters such as date or time, certain figures such as triangles, stars or circles, or lines such as arrows, line segments, or Bezier curves.

Functional Configuration of Relay Device:

Referring to FIG. 6, a functional configuration of the relay device 3 is described according to the embodiment. The relay device 3 includes a data exchange unit 31, which also functions as a transfer unit, a determination unit 35, and a storing/reading processing unit 39. These units are functions implemented by or caused to function by operating any of the hardware elements illustrated in FIG. 4 in cooperation with the instructions of the CPU 301 according to the relay control program expanded from the HD 304 to the RAM 303. Further, the relay device 3 includes a storage unit 3000 implemented by the RAM 303, the HD 304, or the recording medium 315, illustrated in FIG. 4.

The data exchange unit 31, which is implemented by instructions of the CPU 301 and by the network I/F 309 illustrated in FIG. 4, transmits or receives various types of data (or information) to or from other terminal, device, apparatus, or system through the communication network 100. The data exchange unit 31 also functions as a transfer unit, and transfers site image data and audio data transmitted from one terminal to another terminal. The determination unit 35, which is implemented by instructions of the CPU 301 illustrated in FIG. 4, has a function of making various determinations such as determination of whether delay in data transmission has occurred.

The storing/reading processing unit 39, which is implemented by instructions of the CPU 301 illustrated in FIG. 4, has a function of storing various data in the storage unit 3000, and reads various data from the storage unit 3000.

Functional Configuration of Communication Management Apparatus:

Referring to FIG. 6, a functional configuration of the communication management apparatus 5 is described according to the embodiment. The communication management apparatus 5 includes a data exchange unit 51, an authentication unit 52, a determination unit 53, a terminal management unit 54, a session management unit 55, a relay device management unit 56, a drawing screen management unit 57, and a storing/reading processing unit 59. These units are functions implemented by or caused to function by operating any of the hardware elements illustrated in FIG. 4 in cooperation with the instructions of the CPU 501 according to the communication control program expanded from the HD 504 to the RAM 503. Further, the communication management apparatus 5 includes a storage unit 5000 implemented by the RAM 503, the HD 504, or the recording medium 515, illustrated in FIG. 4.

The data exchange unit 51, which is implemented by instructions of the CPU 501 and by the network I/F 509 illustrated in FIG. 4, transmits or receives various types of data (or information) to or from other terminal, device, apparatus, or system through the communication network 100. For example, the data exchange unit 51 controls transmission or reception of stroke data between the electronic whiteboard 1 and other electronic whiteboard.

The authentication unit 52, which is implemented by instructions of the CPU 501 illustrated in FIG. 4, authenticates a login request source terminal, which sends a request for login to the communication management apparatus 5. Specifically, in response to receiving login request information at the data exchange unit 51, the authentication unit 52 authenticates the login request source terminal using information registered in the authentication management DB 5001. The determination unit 53, which is implemented by instructions of the CPU 501 illustrated in FIG. 4, has a function of making various determinations.

The terminal management unit 54, which is implemented by instructions of the CPU 501 illustrated in FIG. 4, manages various information on the electronic whiteboard 1 stored in the terminal management DB 5002 according to a state of the electronic whiteboard 1. For example, the terminal management unit 54 updates information stored in the terminal management DB 5002, such as an operating status, a date and time of reception, and an IP address of a terminal. Further, the terminal management unit 54 manages the destination list management DB 5003, and provides destination list information including a terminal ID of one or more destination terminals managed by the destination list management DB 5003 in response to a request from the electronic whiteboard 1.

The session management unit 55, which is implemented by instructions of the CPU 501 illustrated in FIG. 4, manages a session held in the communication system. For example, the session management unit 55 generates a session ID for identifying a session, according to start request information requesting the start of communication by the electronic whiteboard 1. Further, the session management unit 55 stores and manages, for the session ID of each session, various information related to the session in the session management DB 5004.

The relay device management unit 56, which is implemented by instructions of the CPU 501 illustrated in FIG. 4, has a function of selecting the relay device 3 to be used for relaying data in a particular session from among the plurality of relay devices 3. For example, the relay device management unit 56, which manages the relay device management DB 5005, selects one relay device 3 using various information regarding each relay device 3 stored in the relay device management DB 5005. In one example, the relay device management unit 56 selects the relay device 3 residing near the source terminal, based on the IP address of each relay device 3 stored in the relay device management DB 5005 and the IP address of the source terminal, for example. In another example, the relay device management unit 56 selects the relay device 3 based on, for example, the maximum data transmission rate of each relay device 3 stored in the relay device management DB 5005. The relay device 3 used for relaying data in the session may be selected in any other method. Further, the number of relay devices 3 included in the communication system may be one.

The drawing screen management unit 57, which is implemented by instructions of the CPU 501 illustrated in FIG. 4, manages various data or information related to the drawing screen transmitted and received between the electronic whiteboards 1 (communication terminals). The drawing screen management unit 57 stores, for example, the stroke data transmitted from the electronic whiteboard 1 participating in the session sei, in the drawing screen information management DB 5006 in association with the session ID for management.

The storing/reading processing unit 59, which is implemented by instructions of the CPU 501 illustrated in FIG. 4, has a function of storing various data in the storage unit 5000, and reads various data from the storage unit 5000.

Authentication Management Table:

FIG. 9A is a conceptual diagram illustrating an example of an authentication management table, according to the embodiment. The storage unit 5000 stores an authentication management database (DB) 5001, which is implemented by the authentication management table as illustrated in FIG.

9A. The authentication management table stores, for each one of the electronic whiteboards 1 managed by the communication management apparatus 5, a terminal ID of the electronic whiteboard and a password in association with each other. For example, the authentication management table illustrated in FIG. 9A indicates that the terminal ID of the electronic whiteboard 1a (communication terminal) is "01aa" and the password of the electronic whiteboard 1a is "aaaa". The password is an example of authentication information. The authentication information also includes an access token.

Terminal Management Table:

FIG. 9B is a conceptual diagram illustrating an example of a terminal management table, according to the embodiment. The storage unit 5000 stores a terminal management DB 5002, which is implemented by the terminal management table as illustrated in FIG. 9B. The terminal management table stores, for each one of the terminal IDs identifying the electronic whiteboards 1 (communication terminals), a terminal name to be used when each electronic whiteboard 1 is a destination terminal, an operating status of each electronic whiteboard 1, reception date and time when login request described below is received by the communication management apparatus 5, and the internet protocol (IP) address of each electronic whiteboard 1 (communication terminal) in association with each other. For example, the terminal management table illustrated in FIG. 9B indicates that the electronic whiteboard 1a whose terminal ID is "01aa" has the terminal name "TERMINAL AA, TOKYO OFFICE, JAPAN" and the operating status of the electronic whiteboard 1a is "Online (Ready)". Further, the terminal management table indicates that the date and time when the login request is received by the communication management apparatus 5 is "13:40 on Feb. 10, 2019" and the IP address of the electronic whiteboard 1a is "1.2.1.3". The terminal ID, the terminal name, and the IP address of the communication terminal are stored when each electronic whiteboard 1 is pre-registered to receive service provided by the communication management apparatus 5.

Destination List Management Table:

FIG. 10A is a conceptual diagram illustrating an example of a destination list management table, according to an embodiment. The storage unit 5000 stores a destination list management DB 5003, which is implemented by the destination list management table as illustrated in FIG. 10A. The destination list management table stores the terminal ID of the source terminal (electronic whiteboard 1) that sends a request for a start of communication in association with the terminal IDs of all destination terminals (electronic whiteboards 1) registered as destination terminal candidates for the source terminal. For example, the destination list management table illustrated in FIG. 10A indicates that the destination terminal candidates to which the source terminal (electronic whiteboard 1a) whose terminal ID is "01aa" can send the request for the start of communication are the electronic whiteboard 1b whose terminal ID is "01ab", and other communication terminals identified with "01ba", "01bb", etc. The destination terminal candidates are updated by addition or deletion in response to an addition or deletion request transmitted from any source terminal to the communication management apparatus 5.

The destination list is an example of destination information. In another example, the destination information can be managed in various ways other than the list format as illustrated in FIG. 10A, as long as information on destination such as a terminal ID can be obtained.

Session Management Table:

FIG. 10B is a conceptual diagram illustrating an example of a session management table, according to the embodiment. The storage unit 5000 stores a session management DB 5004, which is implemented by the session management table as illustrated in FIG. 10B. The session management table stores, for each session ID for identifying a session to perform mutual communication between each electronic whiteboard 1 (communication terminal) and the relay device 3, a relay device ID of the relay device 3 to be used, a source terminal ID of the electronic whiteboard 1 (source terminal), a destination terminal ID of electronic whiteboard 1 (destination terminal), a delay time (ms) in receiving site image data at the destination terminal, and reception date and time when delay information indicating this delay time is transmitted from the destination terminal and received by the communication management apparatus 5, in association. For example, the session management table illustrated in FIG. 10 indicates that, in a communication session identified with the session ID "se01", the relay device with the relay device ID "111a" relayed site image data and audio data between the electronic whiteboard with the terminal ID "01aa" and the electronic whiteboard with the terminal ID "01db", the delay time of the site image data received by the electronic whiteboard (destination terminal) at "13:41 on Feb. 10, 2019" was 200 ms.

Relay Device Management Table:

FIG. 10C is a conceptual diagram illustrating an example of a relay device management table, according to the embodiment. The storage unit 5000 stores a relay device management DB 5005, which is implemented by the relay device management table as illustrated in FIG. 10C. The relay device management table stores, for each one of the relay devices 3, the relay device ID, the operating status of the relay device 3, the date and time when the communication management apparatus 5 received status information indicating the operating status, an IP address of the relay device 3, and maximum data transmission rate (Mbps) of the relay device 3, in association. For example, the relay device management table illustrated in FIG. 10C indicates that the relay device 3 whose relay device ID is "111a" has the operation status "Online", the date and time when the communication management apparatus 5 received the operating status is "13:30 on Feb. 10, 2019", the IP address of the relay device 3 is "1.2.1.2", and the maximum data transmission rate of the relay device 3 is 100 Mbps.

Drawing Screen Information Management Table:

FIG. 11 is a conceptual diagram illustrating an example of a drawing screen information management table, according to the embodiment. The storage unit 5000 stores a drawing screen information management DB 5006, which is implemented by the drawing screen information management table as illustrated in FIG. 11. The drawing screen information management table stores, for each session ID identifying a session to perform mutual communication between each electronic whiteboard 1 (communication terminal) and the relay device 3, various data related to a drawing screen to be shared between the electronic whiteboards 1. Various data in the drawing screen information management table correspond to a state of the drawing screen stored in the drawing screen management DB 1001 for each electronic whiteboard 1 (FIG. 7).

For example, the drawing screen information management table includes an ID for identifying each data, a sequence number indicating an order determined by the time when each data was generated, information (body) indicating the content of each data, and information (parent) for identifying a parent (root) of each data. For example, in the case of conference information indicating a video conference being executed by a plurality of electronic whiteboards 1, the drawing screen information management table includes a conference ID (session ID) for identifying the conference being executed, information (children) indicating one or more pages having been generated at the conference, and information (current page) indicating a page of the drawing screen currently displayed on the electronic whiteboard 1. In another example, in the case of page data, the drawing screen information management table includes a page ID for identifying a page (page data), and a URL (Uniform Resource Locator) indicating the storage location of background image data of that page.

In another example, in the case of stroke data, the drawing screen information management table includes a stroke ID for identifying the stroke data generated by the "stroke drawing" event, information (body) indicating the content of the stroke data, and information (parent) identifying a parent page (page data). In this case, the information (body) indicating the content of the stroke data includes a color of the drawn stroke, a width indicating the line thickness of the drawn stroke, and a vertex (x, y) of the drawn stroke.

In the embodiment, the "stroke drawing" is processing of inputting drawing data by a user. For example, the stroke drawing is an event detected from when a user presses the electronic pen 190 against the display 180 and moves the electronic pen 190 with the electronic pen in contact with the surface of the display 180 until when the user releases the electronic pen 190 from the display 180. The color of the stroke is represented in a data format of RGBA (Red Green Blue Alpha), and each element is represented by a numerical value of 0 to 255. Further, the width of the line of the drawn stroke is represented by the number of pixels. The vertices of the drawn stroke are represented by X-Y coordinates. A Bezier curve obtained from the vertices forms a line segment indicating the stroke. Using this drawing screen information management table, the communication management apparatus 5 manages various data relating to a drawing screen, including stroke data generated during a video conference, conducted through a particular communication session.

Functional Configuration of Image Storage Device:

Referring to FIG. 6, a functional configuration of the image storage device 7 is described according to the embodiment. The image storage device 7 includes a data exchange unit 71, a generation unit 73, and a storing/reading processing unit 79. These units are functions that are implemented by or that are caused to function by operating any of the elements illustrated in FIG. 4 in cooperation with instructions of the CPU 701 according to the image storage device control program expanded from the HD 704 to the RAM 703. Further, the image storage device 7 includes a storage unit 7000 implemented by the RAM 703, the HD 704, or the recording medium 715, illustrated in FIG. 4.

The data exchange unit 71, which is implemented by instructions of the CPU 701 and by the network I/F 709 illustrated in FIG. 4, transmits or receives various types of data (or information) to or from other terminal, device, apparatus, or system through the communication network 100. The generation unit 73, which is implemented by the instructions of the CPU 701 illustrated in FIG. 4, generates a URL indicating the storage location of the background image data. The storing/reading processing unit 79, which is implemented by instructions of the CPU 701 illustrated in FIG. 4, has a function of storing various data in the storage unit 7000, and reads various data from the storage unit 7000.

Operation:

Referring to FIGS. 12A to 20, operation performed by the communication system is described according to the embodiment.

Figure 12A:
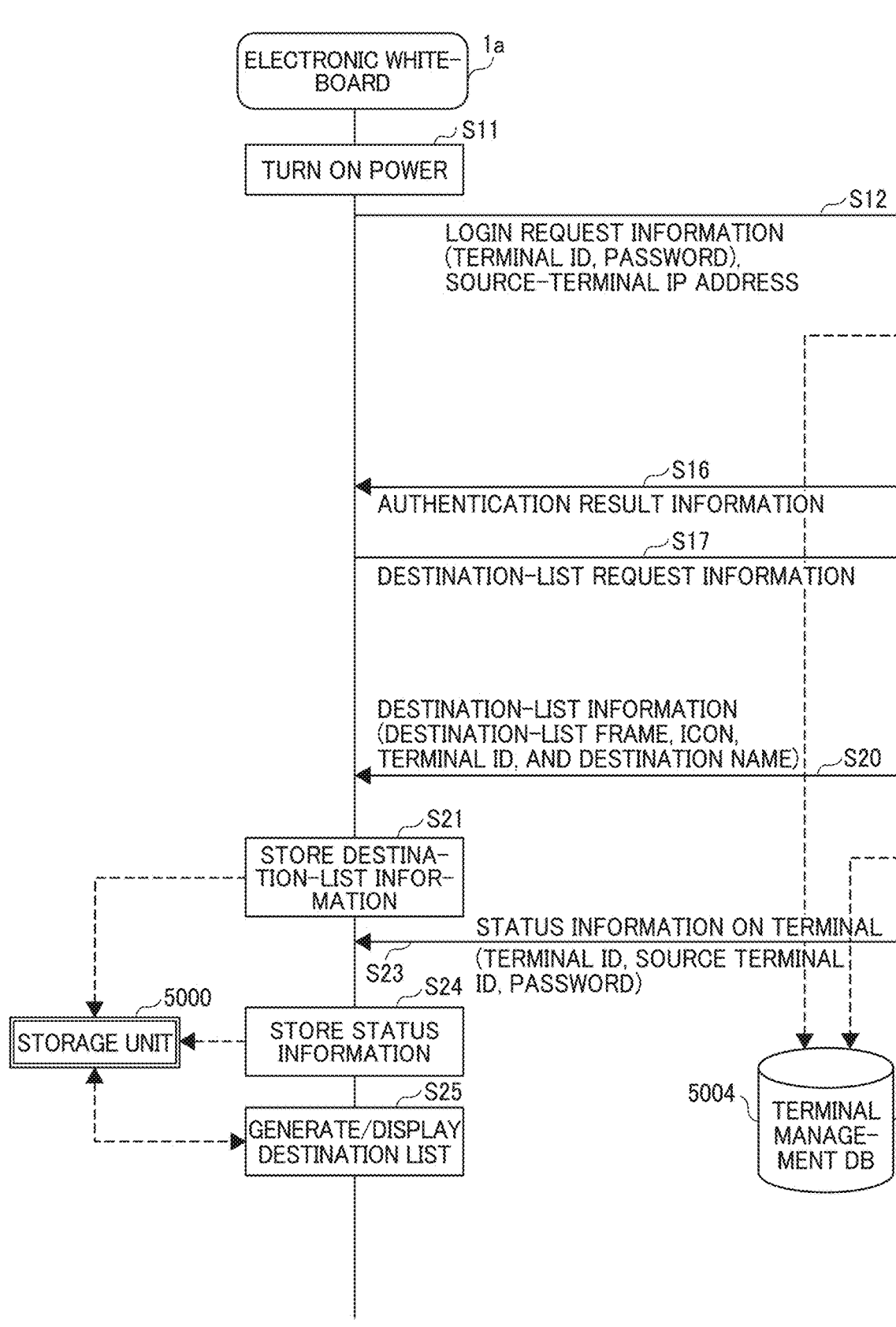
FIGS. 12A and 12B (FIG. 12) are a sequence diagram illustrating operation for preparing to start remote communication between electronic whiteboards, according to an embodiment.
Figure 12B:
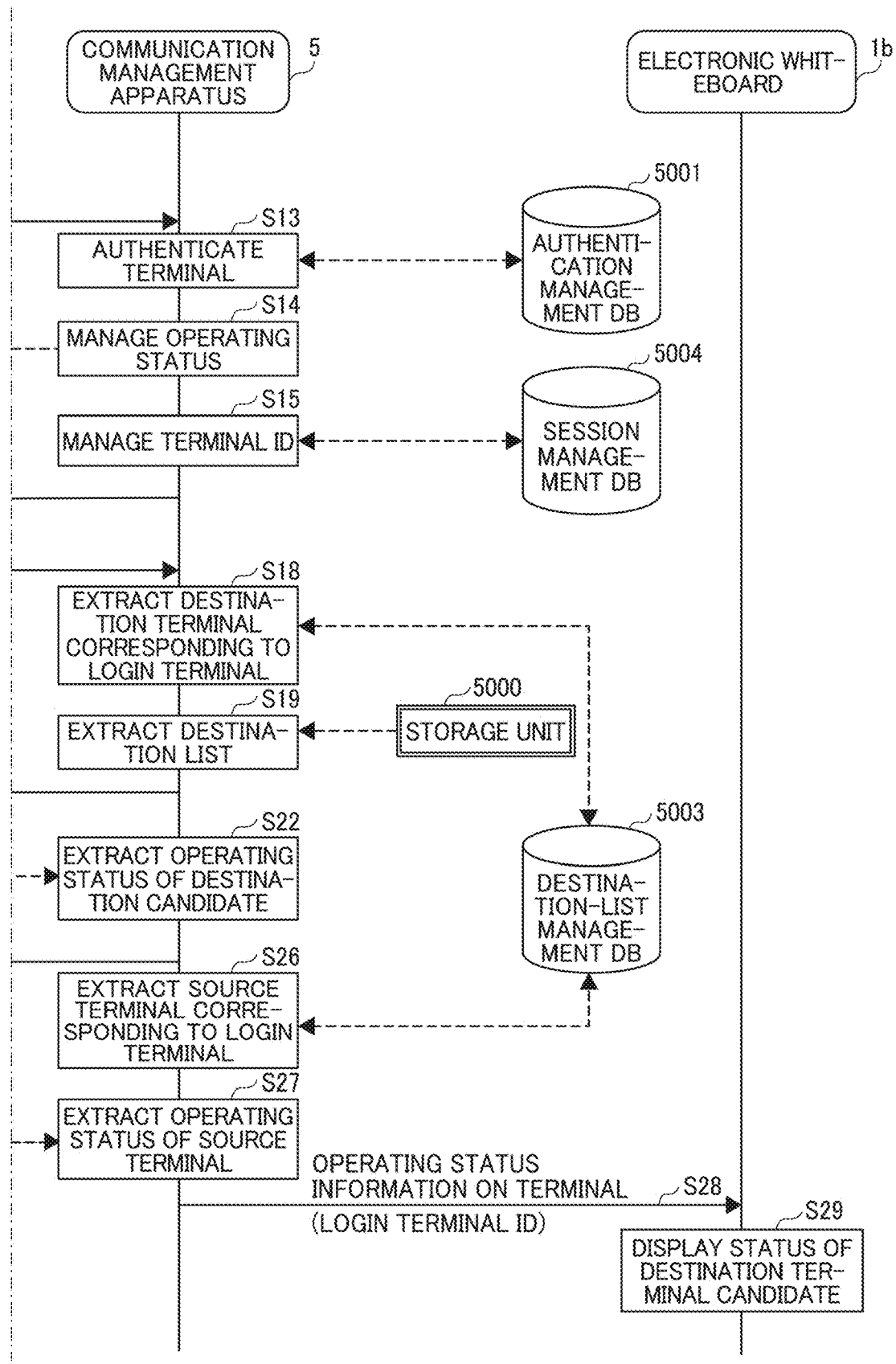

Operation of Preparing for Remote Communication:

First, a description is given of operation of preparing for remote communication, performed by the electronic whiteboard 1*a* as a login request sender terminal, with reference to FIGS. 12A, 12B and FIG. 13. FIGS. 12A and 12B (FIG. 12) are a sequence diagram illustrating operation for preparing to start remote communication between the electronic whiteboards. FIG. 13 is a diagram illustrating an example of a destination list screen displayed on the electronic whiteboard. The electronic whiteboard 1*b* performs login operation in the same or substantially the same manner as the electronic whiteboard 1*a*, and thus the redundant description thereof is omitted below.

As the power switch 122 of the electronic whiteboard 1*a* is turned on, the acceptance unit 12*a* accepts a request to turn on the power of the electronic whiteboard 1*a* (S11).

The data exchange unit 11*a* transmits login request information indicating a request for login authentication to the communication management apparatus 5 through the communication network 100 (S12). This login request information includes the terminal ID of the electronic whiteboard 1*a* and the password. The terminal ID and the password are data that have been read via the storing/reading processing unit 19*a* from the storage unit 1000*a* and sent to the data exchange unit 11*a*. In another example, a terminal ID and/or a password input by the user using an input device (input means) such as a keyboard may be transmitted. In still another example, a terminal ID and/or a password read from a storage medium such as a subscriber identity module (SIM) card or an SD card connected to the electronic whiteboard 1*a* may be transmitted. Thereby, the data exchange unit 51 of the communication management apparatus 5 receives the login request information transmitted from the electronic whiteboard 1*a*.

Next, the authentication unit 52 of the communication management apparatus 5 searches the authentication management table (FIG. 9A) using the terminal ID and the password included in the login request information received via the data exchange unit 51 as search keys. When the combination of the terminal ID and the password included in the login request information is registered in the authentication management table, the authentication unit 52 permits the login of the electronic whiteboard 1*a* (S13). Here, when the combination of the terminal ID and the password included in the login request information is registered in the authentication management table, operation subsequent to S14 is performed.

When the login of the electronic whiteboard 1*a* is allowed, the terminal management unit 54 updates information associated with the terminal ID "01aa" of the electronic whiteboard 1*a* in the terminal management table (FIG. 9B). For example, the terminal management unit 54 changes the operating status of the terminal ID "01aa" to "Online (Ready)" and updates the reception date and time to indicate the date and time when the login request information is received (S14). Here, the IP address of the communication terminal (electronic whiteboard) may not be the IP address that is previously registered, but may be the IP address that is transmitted from the electronic whiteboard 1*a* at S12. As illustrated in FIG. 9B, in the terminal management table, the terminal ID "01aa", the operating status "Online (Ready)", the reception date and time "2019.2.10.13:40", and the IP address "1.2.1.3" are stored in association with each other.

The storing/reading processing unit 55 adds a new record including the terminal ID "01aa" of the electronic whiteboard 1a received at S12 in the session management table as illustrated in FIG. 10B (S15). The data exchange unit 51 transmits the authentication result information indicating the authentication result obtained at S13 to the electronic whiteboard 1a that has sent the login request information through the communication network 100 (S16).

When the data exchange unit 11a of the login request sender terminal (electronic whiteboard 1a) receives the authentication result indicating that login of the communication terminal (electronic whiteboard 1a) is permitted, the data exchange unit 11a transmits destination list request information indicating a request for a destination list to the communication management apparatus 5 through the communication network 100 (S17). Accordingly, the data exchange unit 51 of the communication management apparatus 5 receives the destination list request information.

Next, the terminal management unit 54 searches the destination list management table (FIG. 10A) using the terminal ID "01aa" of the electronic whiteboard 1a (login request sender terminal) as a search key, and reads out the terminal ID of one or more destination terminal candidates that can communicate with the login request sender terminal (electronic whiteboard 1a). The terminal management unit 54 further reads out the destination name associated with the terminal ID of the one or more destination terminal candidates from the terminal management table (FIG. 9B) (S18). As a result, the terminal ID and terminal name of each of the destination terminal candidates corresponding to the terminal ID "01aa" of the login request sender terminal (electronic whiteboard 1a) are extracted.

Next, the data exchange unit 51 reads, for example, destination list frame data and icon data indicating the operating status from the storage unit 5000 through the storing/reading processing unit 59 (S19). The data exchange unit 51 transmits destination list information including the destination list frame and the icons being read, and the terminal IDs and the terminal names extracted at S18, to the login request sender terminal (electronic whiteboard 1a) (S20). Accordingly, the data exchange unit 11a of the login request sender terminal (electronic whiteboard 1a) receives the destination list information. The storing/reading processing unit 19a stores the destination list information that is received in the storage unit 1000a (S21).

As described above, in the present embodiment, the communication management apparatus 5 centrally manages the destination list information of all terminals, instead of that each terminal manages the destination list information. For example, when a new electronic whiteboard 1 is added to the communication system, when a terminal already included in the communication system is replaced with a new model, or when appearance of the destination list frame is to be changed, since the communication management apparatus 5 according to the present embodiment centrally manages all destination candidates, time and efforts otherwise required for each terminal to change the destination list information can be saved.

The terminal management unit 54 searches the terminal management table (FIG. 9B) using the terminal IDs of the destination terminal candidates read at S18 as search keys, to read the operating status associated with the terminal ID of each of the destination terminal candidates. By this searching, the terminal management unit 54 acquires the operating status of each electronic whiteboard 1 associated with the terminal ID of each destination terminal candidate (S22).

The data exchange unit 51 transmits terminal status information including the terminal IDs that are used as the search keys at S22 and the operation statuses of the corresponding destination terminals through the communication network 100 to the login request sender terminal (electronic whiteboard 1a) (S23).

Next, the storing/reading processing unit 19a of the login request sender terminal (electronic whiteboard 1a) successively stores the operation status information of the terminals received from the communication management apparatus 5 in the storage unit 1000a (S24). As a result, the login request sender terminal (electronic whiteboard 1a) acquires the operation status of the destination terminal candidate (electronic whiteboard 1b) that can communicate with the login request sender terminal (electronic whiteboard 1a).

Next, the display control unit 14a of the login request sender terminal (electronic whiteboard 1a) generates a destination list reflecting the operation statuses of the destination terminal candidates based on the destination list information and the operation status information stored in the storage unit 1000a. Further, the display control unit 14a displays a destination list screen 800 as illustrated in FIG. 13 on the display 180 of the electronic whiteboard 1a using the destination list that is generated (S25). On the destination list screen 800, the icon indicating the operation status, the terminal ID, and the terminal name are displayed for each destination terminal candidate. In the example of FIG. 13, the icons representing the operation statuses of the communication terminals displayed from the top of the screen indicate the operation status "Offline", "Online (Ready)", and "Online (Ready)".

The terminal management unit 54 of the communication management apparatus 5 searches the destination list management table (FIG. 10A) based on the terminal ID "01aa" of the login request sender terminal (electronic whiteboard 1a), to obtain the terminal IDs of other communication terminals that have registered the terminal ID "01aa" of the login request sender terminal (electronic whiteboard 1a) as the destination terminal candidate (S26). In the destination list management table illustrated in FIG. 10A, the terminal IDs of other terminals to be read at S26 are "01ab", "01ba", and "01ca".

The terminal management unit 54 searches the terminal management table (FIG. 9B) based on the terminal ID "01aa" of the login request sender terminal (electronic whiteboard 1a), to acquire the operation status of the login request terminal (electronic whiteboard 1a) (S27).

The data exchange unit 51 transmits the terminal status information including the terminal ID "01aa" of the login request sender terminal (electronic whiteboard 1a) and the terminal status information of the terminal having the operation status "Online" acquired at S27, to the communication terminal(s) whose operation status is "Online" in the terminal management table (FIG. 9B), from among the communication terminals identified by the terminal IDs extracted at S26 (S28). When the data exchange unit 51 transmits the terminal status information to the electronic whiteboard 1b, the IP address of the electronic whiteboard stored in the terminal management table (FIG. 9B) is referred to based on each terminal ID. Thus, the terminal ID "01aa" and the operation status "Online" of the login request sender terminal (electronic whiteboard 1a) are transmitted to each of the other destination terminals that can communicate with the login request sender terminal (electronic whiteboard 1a) as a destination terminal candidate. Accordingly, the operation status of the other destination terminal candidate is displayed on the destination terminal candidate (such as the electronic whiteboard 1b) (S29).

Figure 14:
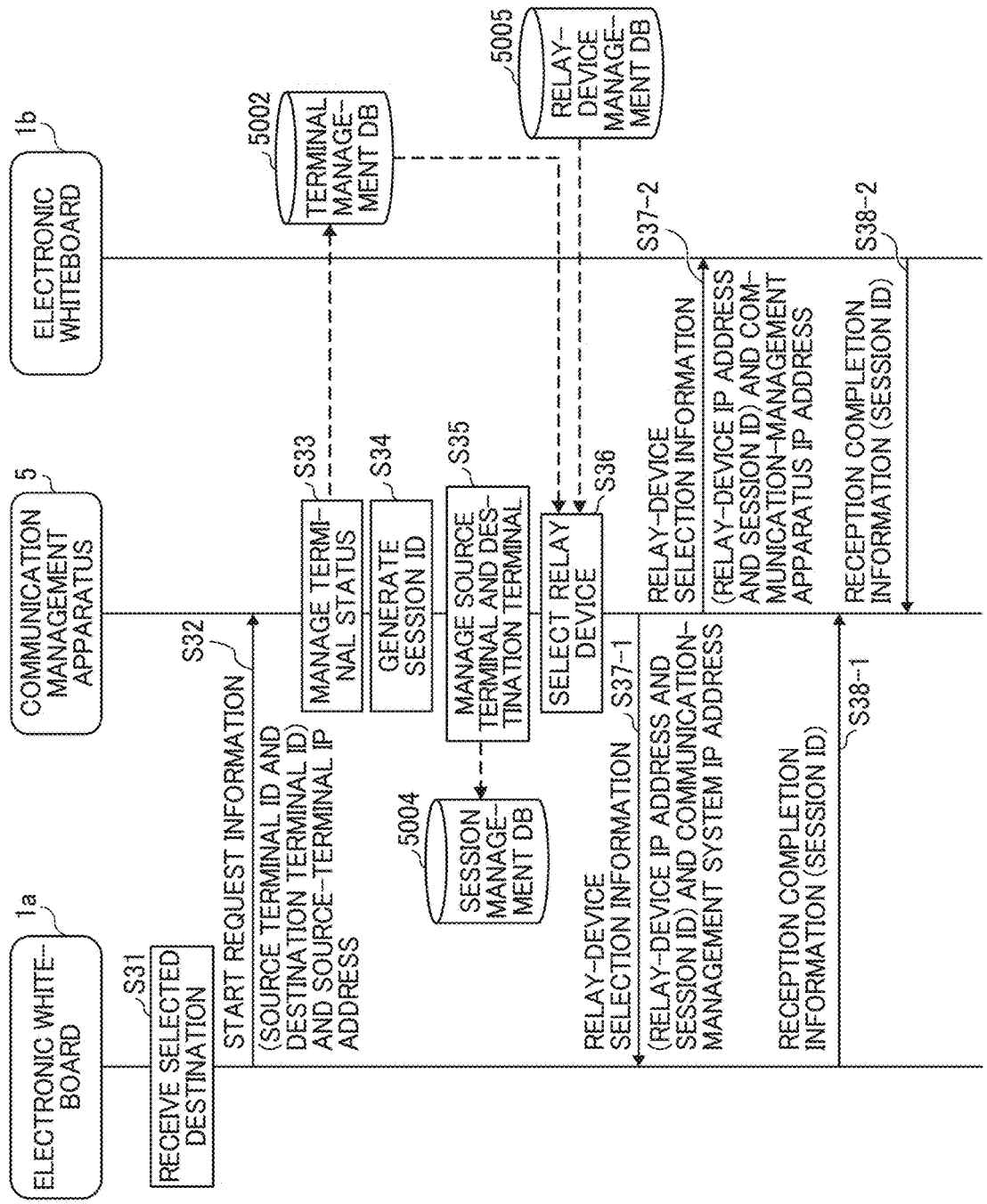
FIG. 14 is a sequence diagram illustrating an example operation of starting communication.
Figure 15:
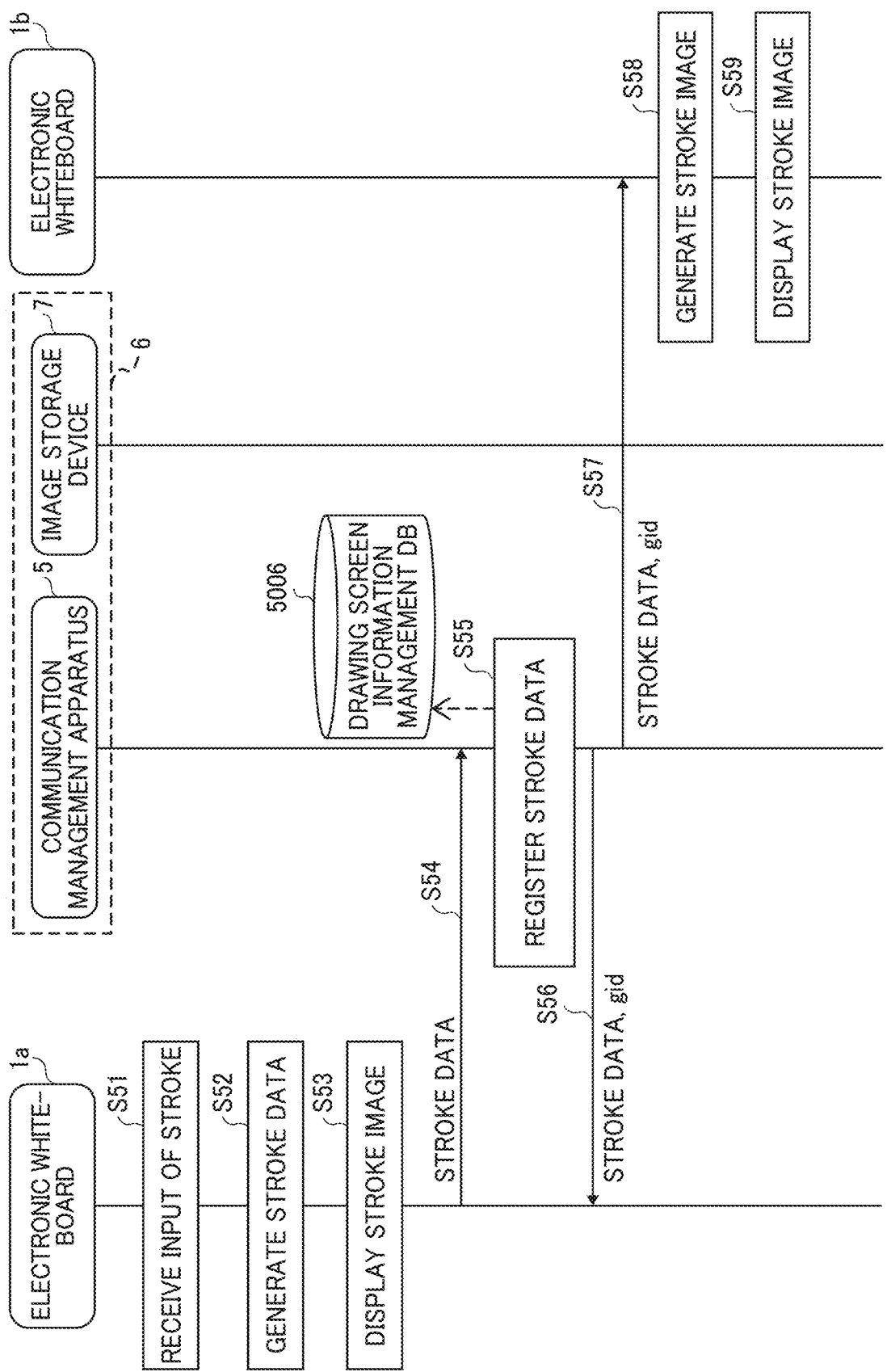
FIG. 15 is a sequence diagram illustrating an example operation of sharing data between electronic whiteboards in the communication system according to the embodiment.

Operation of Starting Remote Communication:

A description is now given of operation in which the electronic whiteboard 1a starts remote communication with the electronic whiteboard 1b, with reference to FIG. 14. FIG. 14 is a sequence diagram illustrating an example operation of starting communication.

As the user A1 of a request source terminal (electronic whiteboard 1a) selects the electronic whiteboard 1b by selecting a destination terminal candidate (terminal ID "01ba") illustrated in FIG. 13, the acceptance unit 12a accepts a request to start communication with the selected destination terminal (electronic whiteboard 1b) (S31). The data exchange unit 11a of the request source terminal (electronic whiteboard 1a) transmits start request information indicating a request for starting communication to the communication management apparatus 5 (S32). The start request information includes the terminal ID "01aa" of the request source terminal (electronic whiteboard 1a) and the terminal ID "01ba" of the destination terminal (electronic whiteboard 1b). Accordingly, the data exchange unit 51 of the communication management apparatus 5 receives the start request information and the IP address of the request source terminal (electronic whiteboard 1a) from which the start request information is transmitted.

The terminal management unit 54 updates the terminal management table (FIG. 9B) based on the terminal ID "01aa" of the request source terminal (electronic whiteboard 1a) and the terminal ID "01ba" of the destination terminal (electronic whiteboard 1b), included in the start request information. The terminal management unit 54 updates the terminal management table (FIG. 9B), to change the operating statuses associated with the terminal IDs "01aa" and "01ba" to "Online (Communicating)", based on the terminal ID "01aa" of the request source terminal (electronic whiteboard 1a) and the terminal ID "01ba" of the destination terminal (electronic whiteboard 1b), included in the start request information. Although a session between the electronic whiteboard 1a (request source terminal) and the electronic whiteboard 1b (destination terminal) is not established, the operating status of each terminal is managed as communicating (S33). Accordingly, the request source terminal (electronic whiteboard 1a) and the destination terminal (electronic whiteboard 1b) have not started a video conference but are in a communicating status. In such case, when a third electronic whiteboard (e.g., electronic whiteboard 1c) tries to make a call with the request source terminal (electronic whiteboard 1a) or the destination terminal (electronic whiteboard 1b), a notification sound or display indicating a busy status is output.

Next, a description is given of operation of executing a session for selecting the relay device 3 to be used. The session management unit 55 of the communication management apparatus 5 generates a session ID for identifying a session, to be established between the electronic whiteboard 1a and the electronic whiteboard 1b (S34). In this embodiment, a description is given of an example case in which the session ID "se01" is generated.

The storing/reading processing unit 59 stores the session ID "se01" generated at S34, the terminal ID "01aa" of the request source terminal (electronic whiteboard 1a), and the terminal ID "01ba" of the destination terminal (electronic whiteboard 1b) in association with each other in the session management table (FIG. 10B) (S35).

Next, the relay device management unit 56 selects the relay device 3 that relays data in the session between the request source terminal (electronic whiteboard 1a) and the destination terminal (electronic whiteboard 1b) (S36). For example, the relay device management unit 56 refers to the terminal management table (FIG. 9B) to determine the relay device IDs of the relay devices 3 each having the operating status "Online" in the relay device management table (FIG. 10C), and selects one of these relay devices 3 having an IP address closest to the IP address of the request source terminal (electronic whiteboard 1a). The following description is given of an example case where the relay device 3 identified by the relay device ID "111a" is selected.

When the relay device selection process at S36 is completed, the data exchange unit 51 of the communication management apparatus 5 transmits relay device selection information to the request source terminal (electronic whiteboard 1a) (S37-1). The relay device selection information includes the IP address of the relay device 3 selected at S36 and the session ID "se01" generated at S34. Further, the request source terminal (electronic whiteboard 1a) acquires the IP address of the communication management apparatus 5, which is the transmission source of the relay device selection information.

Similarly, the data exchange unit 51 of the communication management apparatus 5 transmits the relay device selection information to the destination terminal (electronic whiteboard 1b) (S37-2). The relay device selection information includes the IP address of the relay device 3 selected at S36, the terminal ID "01aa" of the request source terminal (electronic whiteboard 1a), and the session ID "se01" generated at S34. Thereby, the destination terminal (electronic whiteboard 1b) acquires the IP address of the communication management apparatus 5, which is the transmission source of the relay device selection information, in execution of a session with the session ID "se01".

In response to the process of S37-1, the data exchange unit 11a of the request source terminal (electronic whiteboard 1a) transmits reception completion information indicating that the relay device selection information is received at S37-1 to the communication management apparatus 5 (S38-1). The reception completion information includes the session ID exchanged in the process of S37-1. Thereby, the communication management apparatus 5 acknowledges that the transmission of the relay device selection information, executed with the specific session ID "se01" has been completed.

In response to the process of S37-2, the destination terminal (electronic whiteboard 1b) also transmits the reception completion information indicating that the relay device selection information has been received through the process of S37-2 to the communication management apparatus 5 (S38-2). The communication management apparatus 5 acknowledges that the transmission of the relay device selection information, executed with the specific session ID "se01", has been completed.

Thus, the electronic whiteboard 1a and the electronic whiteboard 1b perform a video conference by exchanging site image data and audio data through the relay device 3 selected at S36.

Sharing of Data Between Electronic Whiteboards:

Referring to FIGS. 15 to 19D, processing of sharing data between the electronic whiteboards 1 is described according to the embodiment. FIGS. 15 to 18 are sequence diagrams illustrating an example operation of sharing data between electronic whiteboards in the communication system according to the embodiment. In the present embodiment, the electronic whiteboard 1a and the electronic whiteboard 1b share data, such as the background image data and the stroke data. Here, a case where the background image and the stroke image displayed on the electronic whiteboard 1a are also displayed on the electronic whiteboard 1b is described. In the processing of FIGS. 15 to 18, it is assumed that the screen data corresponding to page 4 illustrated in such as FIG. 7 is shared.

At the site A, as the user A1 moves the electronic pen 190 or the hand H in contact with the display 180 of the electronic whiteboard 1a, the acceptance unit 12a of the electronic whiteboard 1a accepts an input of a stroke movement (trajectory) (S51). The image processing unit 16a generates stroke data (for example, coordinate data (x, y)) for displaying a stroke image on the two-dimensional display 180 based on the stroke input and accepted at the acceptance unit 12a (S52). The display control unit 14a controls the display 180 of the electronic whiteboard 1a to display the stroke image based on the stroke data (S53).

The data exchange unit 11a transmits the stroke data generated at S52 for reproducing the stroke image to the communication management apparatus 5 (S54). Thereby, the data exchange unit 51 of the communication management apparatus 5 receives the stroke data transmitted from the electronic whiteboard 1a. The drawing screen management unit 57 stores the stroke data received at S54 in the drawing screen information management DB 5006 (FIG. 11) (S55). In this case, as illustrated in FIG. 11, the drawing screen management unit 57 stores, in the stroke data information management table, items of the stroke data received by the data exchange unit 51 in the order of occurrence (sequence order) in association with the conference ID (the session ID) of a session with which the remote conference is conducted. Further, the drawing screen management unit 57 assigns a specific number to the gid, associated with the stroke data received at S54.

Next, the data exchange unit 51 transmits the stroke data stored at S55 and the gid having the number assigned by the drawing screen management unit 57, to the electronic whiteboard 1a (S56). Accordingly, the electronic whiteboard 1a receives the stroke data and the gid transmitted from the communication management apparatus 5. That is, the electronic whiteboard 1a is informed of the accepted stroke data and the numbered gid.

The data exchange unit 51 transmits the stroke data and the gid to the electronic whiteboard 1b, which is the counterpart terminal (S57). Accordingly, the data exchange unit 11b of the electronic whiteboard 1b receives the stroke data and the gid transmitted from the communication management apparatus 5. Then, the image processing unit 16b of the electronic whiteboard 1b generates a stroke image based on the stroke data received at the data exchange unit 11b (S58). The display control unit 14b controls the display 180 of the electronic whiteboard 1b to display the stroke image generated at S67 (S59). Accordingly, the communication system can share the stroke image drawn on the electronic whiteboard 1a with the electronic whiteboard 1b.

Figure 16:
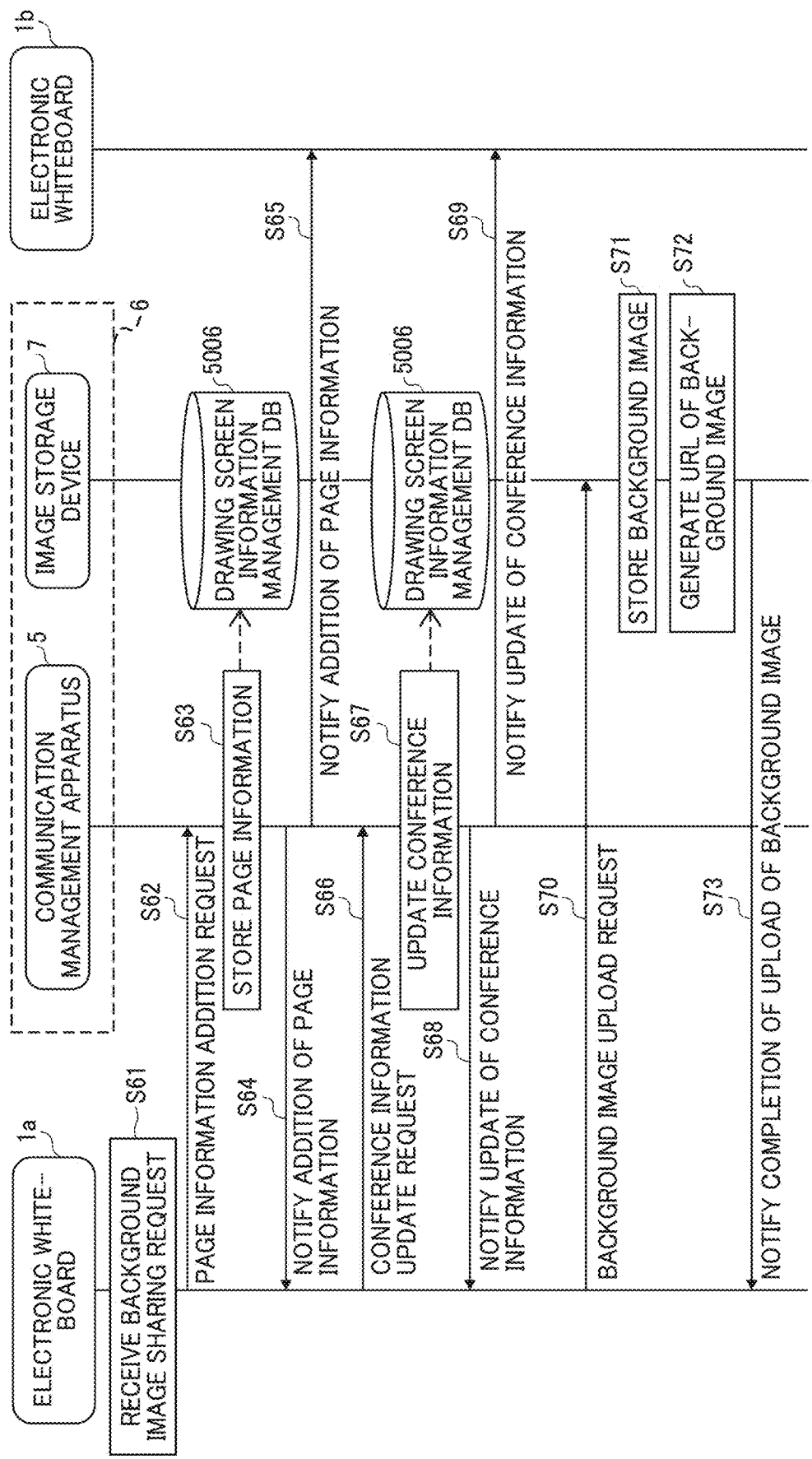
FIG. 16 is a sequence diagram illustrating an example operation of sharing data between electronic whiteboards in the communication system according to the embodiment.

Subsequently, as illustrated in FIG. 16, the acceptance unit 12a of the electronic whiteboard 1a at the site A receives a request for sharing a background image (S61). Specifically, when the user A1 of the electronic whiteboard 1a presses a predetermined sharing button displayed on the display 180, the acceptance unit 12a receives a request for processing of sharing a background image.

Next, the data exchange unit 11a transmits a page information addition request that requests addition of page information to the communication management apparatus 5 (S62). This page information addition request includes a page ID for identifying a page for which addition is requested, and information (parent) for identifying a conference as a parent. In this case, the data exchange unit 11a transmits a page information addition request including the page ID "pag04" and the parent "se01" to the communication management apparatus 5, for example. The data exchange unit 51 of the communication management apparatus 5 receives the page information addition request from the electronic whiteboard 1a.

The drawing screen management unit 57 stores various information received at S62 in the drawing screen information management DB 5006 (FIG. 11) as page information (S63). The drawing screen management unit 57 also assigns a gid corresponding to the page (page data) to be stored in the drawing screen information management DB 5006.

The data exchange unit 51 transmits, to the electronic whiteboard 1a, a page information addition notification indicating that the page information is added to the drawing screen information management DB 5006 (S64). This page information addition notification includes a page ID for identifying the added page, information (parent) for identifying the conference as a parent, and information for identifying the gid numbered by the drawing screen management unit 57. In this case, the data exchange unit 51 transmits, for example, the page information addition notification including the page ID "pag04", the parent "se01", and the gid "gid04" to the electronic whiteboard 1a. Accordingly, the data exchange unit 11a of the electronic whiteboard 1a receives the page information addition notification transmitted from the communication management apparatus 5. Further, the data exchange unit 51 transmits a page information addition notification to the electronic whiteboard 1b as a counterpart terminal (S65). The information included in the page information addition notification is the same as the information transmitted to the electronic whiteboard 1a at S64. Accordingly, the data exchange unit 11b of the electronic whiteboard 1b receives the page information addition notification transmitted from the communication management apparatus 5.

Subsequently, the data exchange unit 11a of the electronic whiteboard 1a transmits a conference information update request indicating update of the conference information to the communication management apparatus 5 (S66). The conference information update request includes the gid of the conference information requested to be updated, the conference ID for identifying the conference, the information (children) indicating the page generated in the conference, and information (current page) on the page currently displayed on the electronic whiteboard 1a. In this case, the data exchange unit 11a transmits a conference information update request including the gid "gid1", the conference ID "se01", the children "pag01, pag02, pag03, pag04", and the current page "pag04" to the communication management apparatus 5. The data exchange unit 51 of the communication management apparatus 5 receives the conference information update request from the electronic whiteboard 1a.

Next, the drawing screen management unit 57 updates the conference information stored in the drawing screen information management DB 5006 (FIG. 11) based on various information received at S66 (S67). In this case, the drawing screen management unit 57 searches the drawing screen information management table to update the information (body) associated with the conference ID received at the data exchange unit 51. In addition, the drawing screen management unit 57 updates the gid ("gid1") of the conference information received at S67 (for example, gid "gid2").

The data exchange unit 51 transmits a conference information update notification indicating that the conference information has been updated to the electronic whiteboard 1a (S68). The conference information update notification includes the gid updated at S67, the conference ID for identifying the conference, the information (children) indicating the page generated in the conference, and the information (current page) on a page currently displayed on the electronic whiteboard 1a. In this case, the data exchange unit 51 transmits, to the electronic whiteboard 1a, a conference information update notification including gid "gid2", conference ID "se01", children "pag01, pag02, pag03, pag04", and current page "pag04", for example. Accordingly, the data exchange unit 11a of the electronic whiteboard 1a receives the conference information update notification transmitted from the communication management apparatus 5. Further, the data exchange unit 51 transmits a conference information update notification to the electronic whiteboard 1b as a counterpart terminal (S69). The information included in this conference information update notification is the same as the information transmitted to the electronic whiteboard 1a at S68. Accordingly, the data exchange unit 11b of the electronic whiteboard 1b receives the conference information update notification transmitted from the communication management apparatus 5.

The data exchange unit 11a of the electronic whiteboard 1a transmits an upload request of the background image data to the image storage device 7 (S70). In this case, the data exchange unit 51 transmits the background image data to, for example, a predetermined URL (for example, "http://xxx.jp/upload") for upload. Thereby, the data exchange unit 71 of the image storage device 7 receives the upload request from the electronic whiteboard 1a. The storing/reading processing unit 79 of the image storage device 7 stores the background image data received at S70 in the storage unit 7000 (S71). Further, the generation unit 73 generates a URL indicating the storage location of the background image data stored at S71 (S72). The URL is an example of storage location information. In another example, the storage location information includes a URI. The data exchange unit 71 transmits an upload completion notification indicating that uploading of the background image data is completed to the electronic whiteboard 1a (S73). This upload completion notification includes the URL generated at S72. Accordingly, the data exchange unit 11a of the electronic whiteboard 1a receives the upload completion notification transmitted from the image storage device 7.

Figure 17:
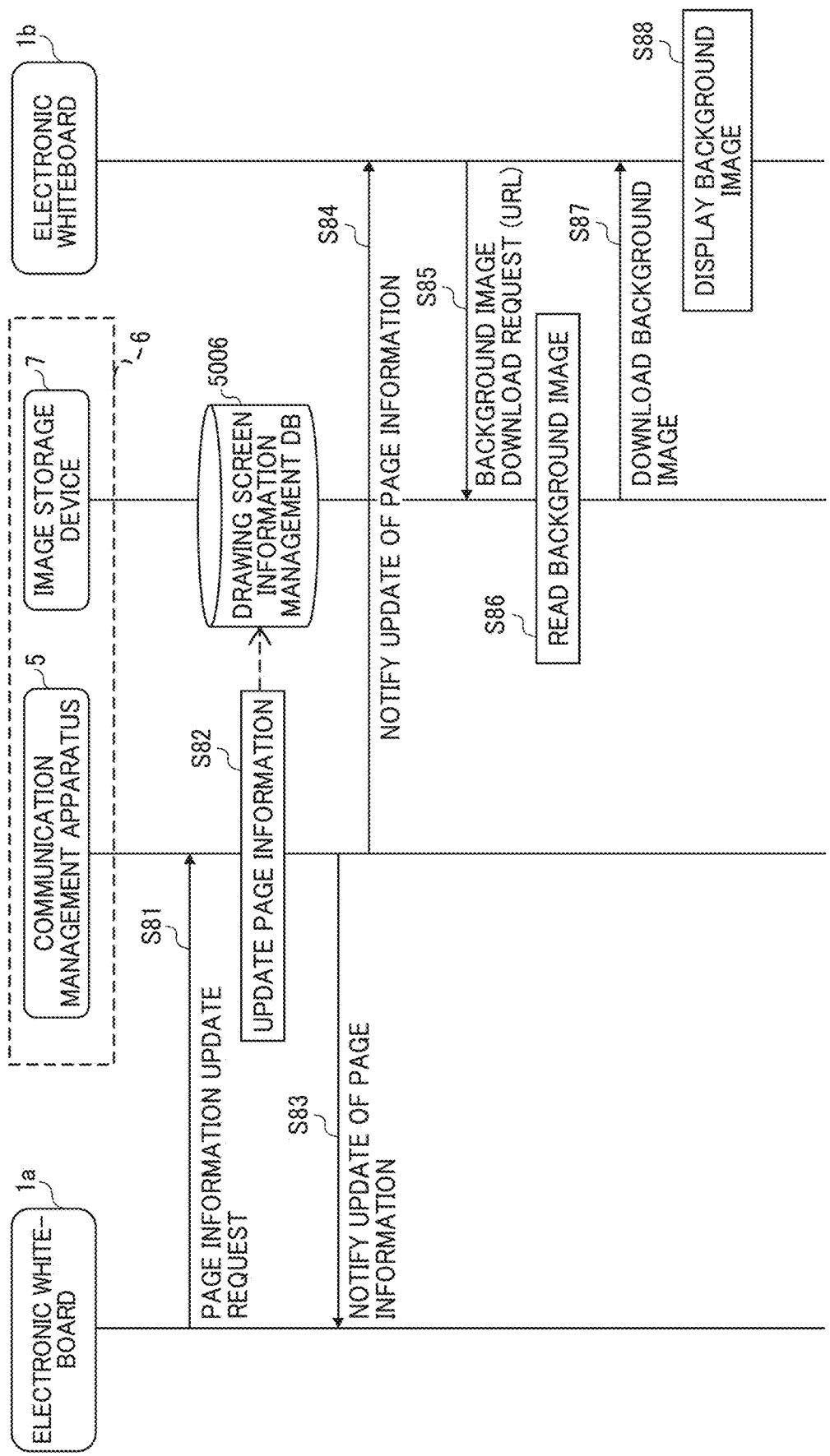
FIG. 17 is a sequence diagram illustrating an example operation of sharing data between electronic whiteboards in the communication system according to the embodiment.

Referring to FIGS. 17 and 19, processing to be performed after the background image data is uploaded from the electronic whiteboard 1a to the image storage device 7 is described according to the embodiment. First, referring to FIG. 17, processing to be performed when the electronic whiteboard 1a has transmitted the page information addition notification at S62 is described as an example.

As illustrated in FIG. 17, the data exchange unit 11a of the electronic whiteboard 1a transmits, to the communication management apparatus 5, a page information update request requesting update of page information (S81). The page information update request includes the page ID for identifying the page, the information (parent) for identifying a conference as a parent, the gid information of the page received at S64, and the URL information received at S73. In this case, the data exchange unit 11a transmits a page information update request including the page ID "pag04", the parent "se01", the gid "gid04", and the URL "YYY.jpeg" to the communication management apparatus 5, for example. The data exchange unit 51 of the communication management apparatus 5 receives the page information update request from the electronic whiteboard 1a.

Next, the drawing screen management unit 57 updates the page information stored in the drawing screen information management DB 5006 (FIG. 11) based on various information received at S81 (S82). Specifically, the drawing screen management unit 57 searches the drawing screen information management table to update the information (body) associated with the page ID received at S81. In addition, the drawing screen management unit 57 updates the gid ("gid04") of the page information received at S81 (for example, gid "gid05").

The data exchange unit 51 of the communication management apparatus 5 transmits a page information update notification indicating that the page information has been updated to the electronic whiteboard 1a (S83). The page information update notification includes the page ID for identifying the page, the information (parent) for identifying a conference as a parent, the gid information of the page updated at S82, and the URL information of the background image data. In this case, the data exchange unit 51 transmits, for example, a page information update notification including the page ID "pag04", the parent "se01", the gid "gid05", and the URL "YYY.jpeg" to the electronic whiteboard 1a. Accordingly, the data exchange unit 11a of the electronic whiteboard 1a receives the page information update notification transmitted from the communication management apparatus 5. Further, the data exchange unit 51 of the communication management apparatus 5 transmits a page information update notification to the electronic whiteboard 1b as a counterpart terminal (S84). The information included in the page information update notification is the same as the information transmitted to the electronic whiteboard 1a at S83. Accordingly, the data exchange unit 11b of the electronic whiteboard 1b receives the page information update notification transmitted from the communication management apparatus 5.

The data exchange unit 11b of the electronic whiteboard 1b transmits a download request that requests downloading of the background image data, to the URL received at S84, which indicates the storage location at the image storage device 7 (S85). Thereby, the data exchange unit 71 of the image storage device 7 receives the download request from the electronic whiteboard 1b.

Next, the storing/reading processing unit 79 of the image storage device 7 reads the requested background image data from the storage unit 7000 based on the URL indicated by the download request received at the data exchange unit 71 (S86). The data exchange unit 71 transmits the requested background image data to the electronic whiteboard 1b as the request source terminal (S87). Thereby, the data exchange unit 11b of the electronic whiteboard 1b downloads (receives) the background image data. The display control unit 14b of the electronic whiteboard 1b controls the display 180 to display the background image based on the background image data downloaded (received) at the data exchange unit 11b (S88).

Figure 18:
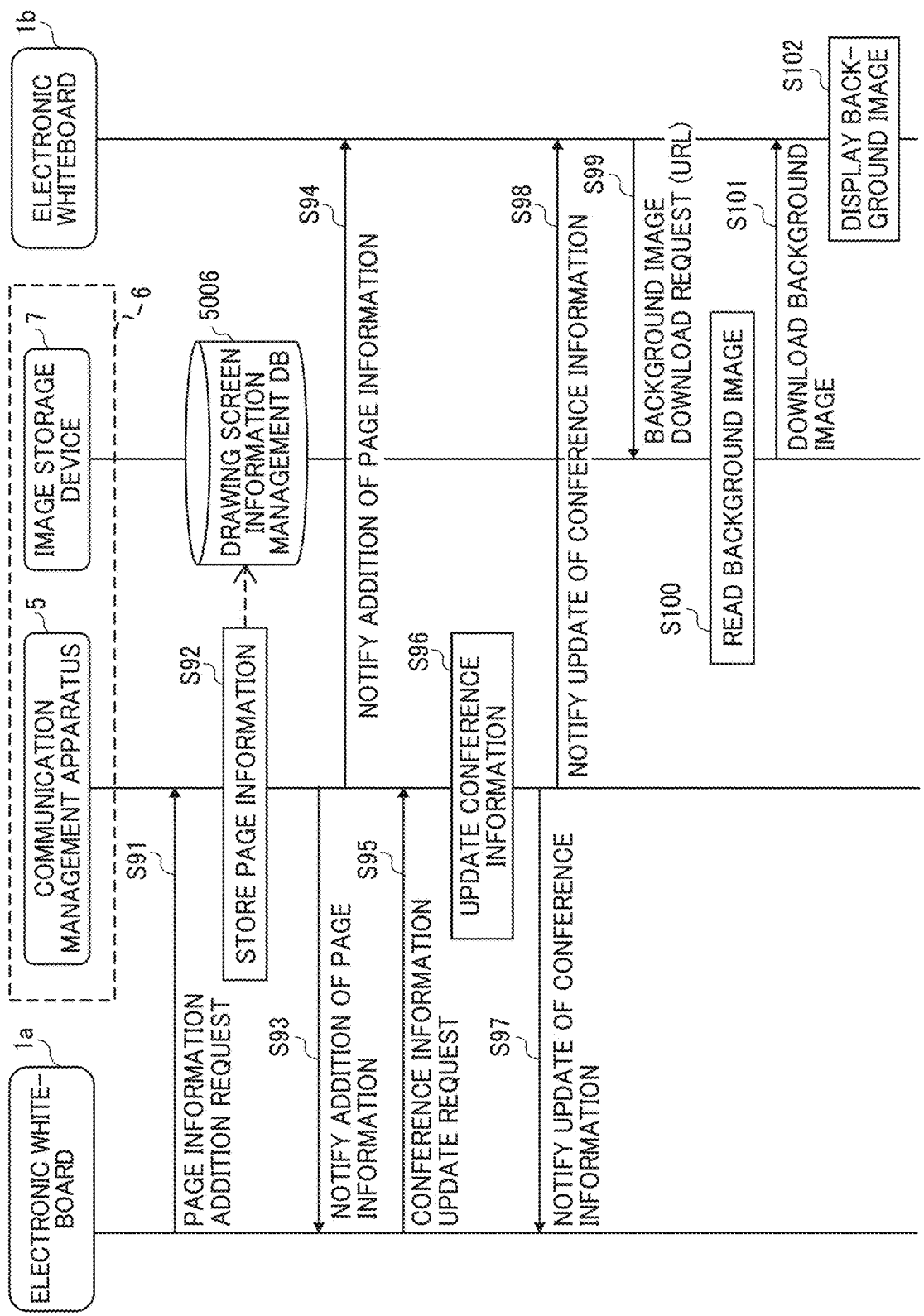
FIG. 18 is a sequence diagram illustrating an example operation of sharing data between electronic whiteboards in the communication system according to the embodiment.

Next, referring to FIG. 18, processing to be performed when the electronic whiteboard 1a has not transmitted the page information addition notification at S62 to the communication management apparatus 5 is described as an example.

As illustrated in FIG. 18, the data exchange unit 11a of the electronic whiteboard 1a transmits, to the communication management apparatus 5, a page information addition request requesting addition of page information (S91). This page information addition request includes a page ID for identifying the page for which addition is requested, information (parent) for identifying a conference as a parent, and information on the URL of the background image data received at S73. In this case, the data exchange unit 11*a* transmits a page information addition request including the page ID "pag04", the parent "se01", and the URL "http://YYY.jpeg" to the communication management apparatus 5, for example. The data exchange unit 51 of the communication management apparatus 5 receives the page information addition request from the electronic whiteboard 1*a*.

Next, the drawing screen management unit 57 instructs the drawing screen information management DB 5006 (FIG. 11) to store various information received at S91 as page information (S92). The drawing screen management unit 57 also assigns a gid corresponding to the page (page data) to be stored in the drawing screen information management DB 5006.

The data exchange unit 51 transmits, to the electronic whiteboard 1*a*, a page information addition notification indicating that the page information is added to the drawing screen information management DB 5006 (S93). This page information addition notification includes a page ID for identifying the added page, information (parent) for identifying a conference as a parent, information on a gid numbered by the drawing screen management unit 57, and URL information of the background image data. In this case, the data exchange unit 51 transmits, for example, a page information addition notification including the page ID "pag04", the parent "se01", the gid "gid04", and the "http://YYY.jpeg" to the electronic whiteboard 1*a*. Accordingly, the data exchange unit 11*a* of the electronic whiteboard 1*a* receives the page information addition notification transmitted from the communication management apparatus 5. Further, the data exchange unit 51 transmits a page information addition notification to the electronic whiteboard 1*b* as a counterpart terminal (S94). The information included in the page information addition notification is the same as the information transmitted to the electronic whiteboard 1*a* at S93. Accordingly, the data exchange unit 11*b* of the electronic whiteboard 1*b* receives the page information addition notification transmitted from the communication management apparatus 5.

Subsequently, the data exchange unit 11*a* of the electronic whiteboard 1*a* transmits a conference information update request indicating update of the conference information to the communication management apparatus 5 (S95). The conference information update request includes the gid of the conference information requested to be updated, the conference ID for identifying the conference, information (children) indicating the page generated in the conference, and information (current page) on the page currently displayed on the electronic whiteboard 1*a*. In this case, the data exchange unit 11*a* transmits a conference information update request including the gid "gid1", the conference ID "se01", the children "pag01, pag02, pag03, pag04", and the current page "pag04" to the communication management apparatus 5. The data exchange unit 51 of the communication management apparatus 5 receives the conference information update request from the electronic whiteboard 1*a*.

Next, the drawing screen management unit 57 updates the conference information stored in the drawing screen information management DB 5006 (FIG. 11) based on various information received at S95 (S96). In this case, the drawing screen management unit 57 searches the drawing screen information management table to update the information (body) associated with the conference ID received at the data exchange unit 51. In addition, the drawing screen management unit 57 updates the gid ("gid1") of the conference information received at S95 (for example, gid "gid2").

The data exchange unit 51 transmits a conference information update notification indicating that the conference information has been updated to the electronic whiteboard 1*a* (S97). The conference information update notification includes the gid updated at S96, the conference ID for identifying the conference, the information (children) indicating the page generated in the conference, and the information (current page) on a page currently displayed on the electronic whiteboard 1*a*. In this case, the data exchange unit 51 transmits, to the electronic whiteboard 1*a*, a conference information update notification including gid "gid2", conference ID "se01", children "pag01, pag02, pag03, pag04", and current page "pag04", for example. Accordingly, the data exchange unit 11*a* of the electronic whiteboard 1*a* receives the conference information update notification transmitted from the communication management apparatus 5. Further, the data exchange unit 51 transmits a conference information update notification to the electronic whiteboard 1*b* as a counterpart terminal (S98). The information included in this conference information update notification is the same as the information transmitted to the electronic whiteboard 1*a* at S68. Accordingly, the data exchange unit 11*b* of the electronic whiteboard 1*b* receives the conference information update notification transmitted from the communication management apparatus 5. Processing from S99 to S102 are performed in the same or substantially the same manner as S85 to S88 described above with reference to FIG. 17, and thus redundant descriptions thereof are omitted below.

Accordingly, the electronic whiteboard 1*a* and the electronic whiteboard 1*b* can share the stroke image and the background image displayed on the display 180. The background image data of the background image displayed on one electronic whiteboard 1 (for example, the electronic whiteboard 1*a*) is uploaded to the image storage device 7, and is then downloaded to other electronic whiteboard 1 (for example, the electronic whiteboard 1*b*). Further, stroke data of strokes drawn on one electronic whiteboard 1 (for example, the electronic whiteboard 1*a*) is shared with other electronic whiteboard 1 (for example, the electronic whiteboard 1*b*) via the communication management apparatus 5. Further, operation information (FIG. 8) related to generation of a drawing screen (page) displayed on the electronic whiteboard 1 or change of a drawing screen (page), is shared between one electronic whiteboard 1 and other electronic whiteboard 1 via the communication management apparatus 5. The stroke data sharing process described referring to S51 to S59 of FIG. 15 and the background image data sharing process described referring to FIGS. 16 to 18 may be performed in any order other than the above-described order, or may be performed concurrently.

Referring now to FIGS. 19A to 19D, example drawing screens shared between the electronic whiteboard 1*a* and the electronic whiteboard 1*b* are described. The drawing screen 200*a* illustrated in FIG. 19A includes a background image v1 and a stroke image st1. The drawing screen 200*b* illustrated in FIG. 19B includes a stroke image st2. The drawing screen 200*c* illustrated in FIG. 19C includes a background image v3 and a stroke image st3. The drawing screen 200*d* illustrated in FIG. 19D includes a background image v4 and a stroke image st4.

Figure 19A:
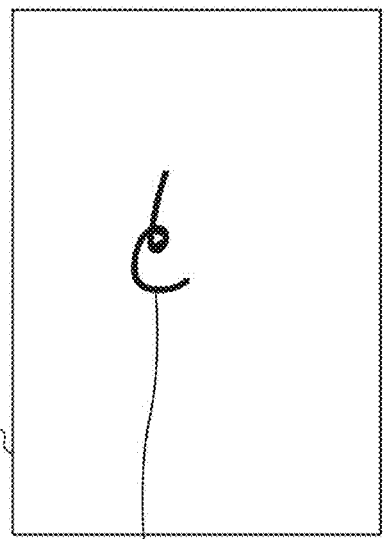
FIGS. 19A, 19B, 19C, and 19D (FIG. 19) are each a diagram illustrating an example of a drawing screen shared between a plurality of electronic whiteboards.
Figure 19B:
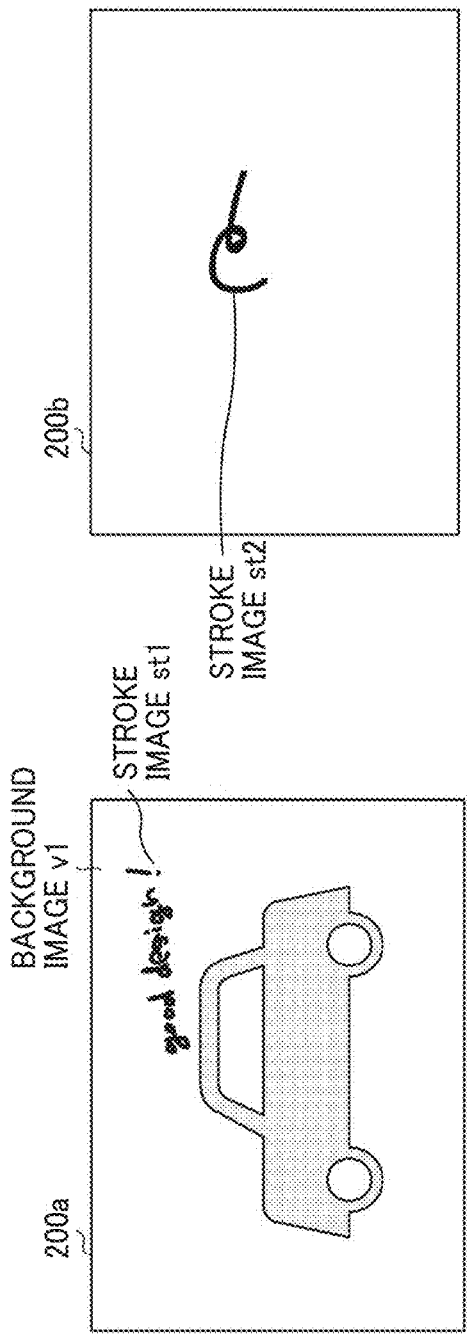
Figure 19C:
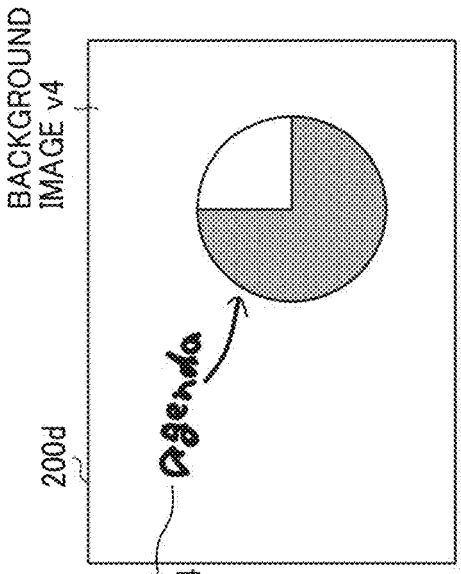
Figure 19D:
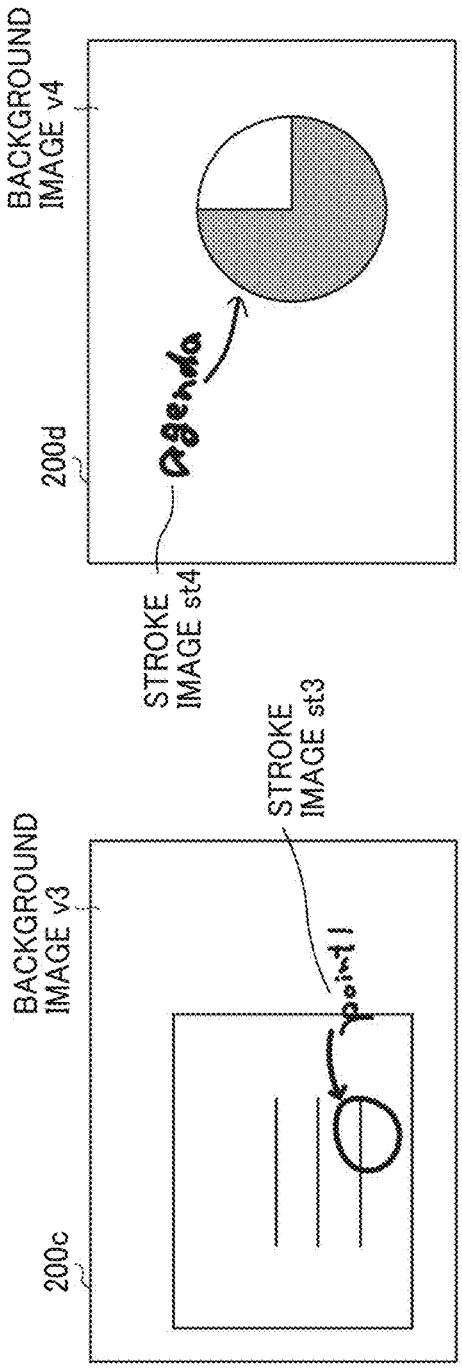

As described above, the electronic whiteboard 1*a* and the electronic whiteboard 1*b* share a plurality of drawing screens as illustrated in FIGS. 19A to 19D. Further, the electronic whiteboard 1*a* and the electronic whiteboard 1*b* manage screen data (background image data and stroke data) constituting the drawing screen displayed on the display 180 as the drawing screen information illustrated in FIG. 7. For example, the drawing screen 200a illustrated in FIG. 19A is a drawing screen corresponding to the screen data of "page 1", and the drawing screen 200b illustrated in FIG. 19B is a drawing screen corresponding to the screen data of "page 2". Further, for example, the drawing screen 200c illustrated in FIG. 19C is a drawing screen corresponding to the screen data of "page 3", and the drawing screen 200d illustrated in FIG. 19D is a drawing screen corresponding to the screen data of "page 4". The drawing screens 200a to 200d illustrated in FIGS. 19A to 19D are examples of display screens displayed on the display 180.

Figure 21:
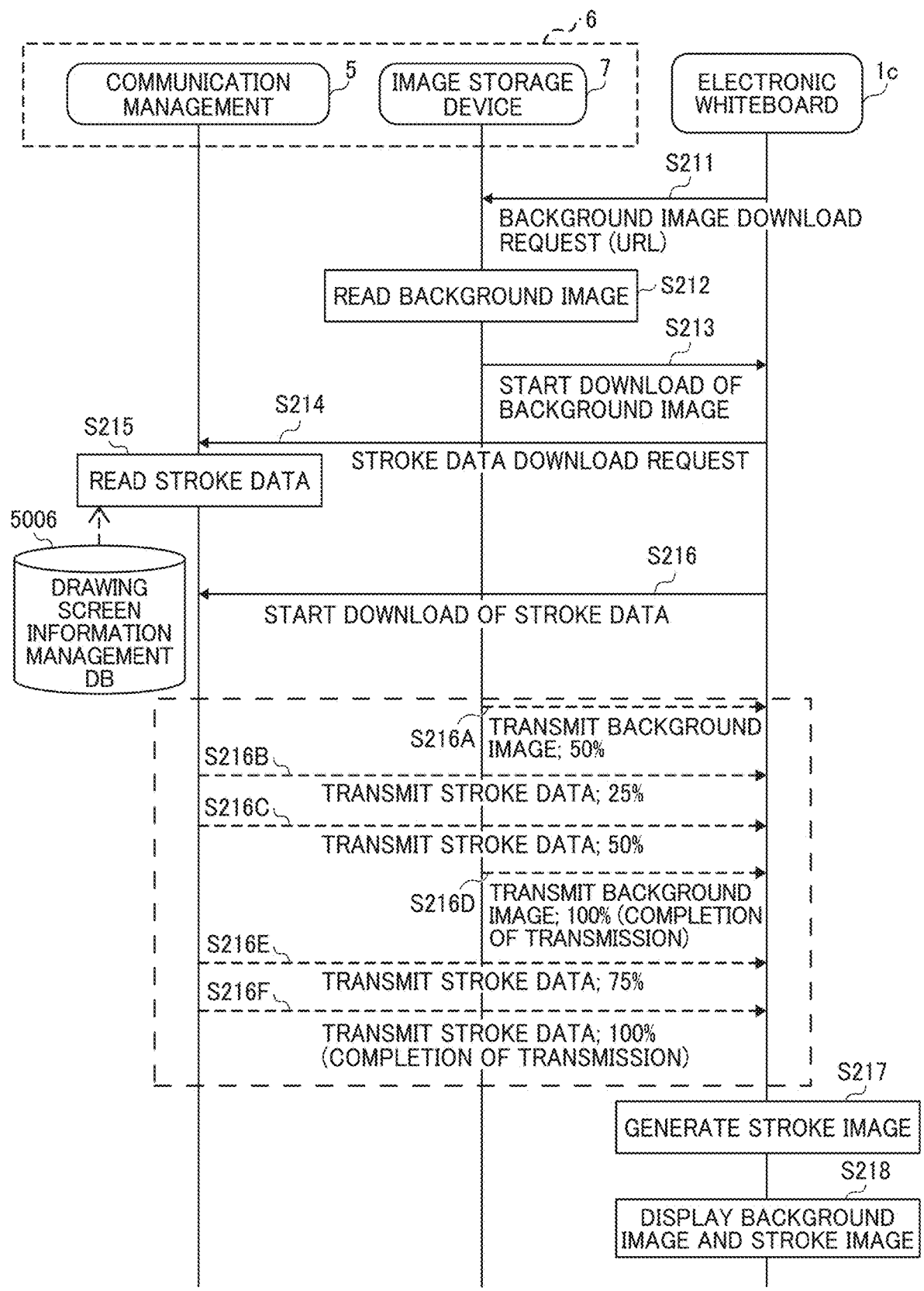
FIG. 21 is a sequence diagram illustrating operation of sharing data with a communication terminal that joins part way through an on-going remote conference, in the communication system, according to the embodiment.

Processing of Sharing Data at Halfway Participating Terminal:

A description is now given of an example in which another electronic whiteboard 1 provided at another site joins part way through a remote conference (video conference) that is already started among the plurality of electronic whiteboards 1 provided at plural sites, with reference to FIG. 20 to FIG. 22. FIGS. 20 and 21 are a sequence diagram illustrating operation of sharing data with a communication terminal that joins part way through an on-going remote conference, in the communication system, according to the embodiment. In the following, an example is described in which the electronic whiteboard 1c participates part way through a remote conference (video conference) that is already conducted between the electronic whiteboard 1a and the electronic whiteboard 1b. In the following, it is assumed that the electronic whiteboard 1a and the electronic whiteboard 1b share drawing screen information including screen data of "page 1" to "page 4" illustrated in FIG. 7. Further, it is assumed that the electronic whiteboard 1a and the electronic whiteboard 1b display a drawing screen (for example, the drawing screen 200d illustrated in FIG. 19D) corresponding to the screen data of "page 4". Here, the electronic whiteboard 1c is an example of a communication terminal, and the electronic whiteboard 1a or the electronic whiteboard 1b is an example of other communication terminal.

The data exchange unit 11c of the electronic whiteboard 1c, which is to join part way through an already-started remote conference (video conference) between the electronic whiteboard 1a and the electronic whiteboard 1b transmits, to the communication management apparatus 5a, a conference participation request that requests participation in the already-started remote conference (S201). The following description is given on the assumption that at the electronic whiteboard 1c, a communication session whose session ID "se01" is established by the operation described above with reference to FIG. 12 and FIG. 14.

The data exchange unit 51 of the communication management apparatus 5 transmits a conference participation notification indicating that the electronic whiteboard 1c has participated in the remote conference, to the electronic whiteboard 1a that is conducting the remote conference using the communication session whose session ID "se01" (S202). The data exchange unit 11a of the electronic whiteboard 1a receives the conference participation notification from the communication management apparatus 5. The data exchange unit 51 transmits the conference participation notification to the electronic whiteboard 1b (S203). The data exchange unit 11b of the electronic whiteboard 1b receives the conference participation notification from the communication management apparatus 5. Thus, the user A1 of the electronic whiteboard 1a and the users B1 and B2 of the electronic whiteboard 1b recognizes that the electronic whiteboard 1c has participated in the remote conference.

Subsequently, the data exchange unit 11c of the electronic whiteboard 1c transmits, to the communication management apparatus 5, a conference information acquisition request that requests acquisition of the conference information on the remote conference for which participation is requested (S204). The data exchange unit 51 of the communication management apparatus 5 receives the conference information acquisition request from the electronic whiteboard 1c. The storing/reading processing unit 59 of the communication management apparatus 5 searches the drawing screen information management DB 5006 (FIG. 11) using the session ID of the communication session in which the remote conference is held as a search key, to read the conference information associated with the session ID (S205). In this case, the storing/reading processing unit 59 reads data associated with the conference ID "se01", corresponding to the session ID "se01", as conference information. The conference information includes information (children) indicating a page generated in the conference (for example, "pag01, pag02, pag03, pag04"), and information (current page) indicating a page constituting a drawing screen currently displayed on the electronic whiteboard 1 (for example, "pag04"). Then, the data exchange unit 51 of the communication management apparatus 5 transmits the conference information read at S205 to the electronic whiteboard 1c (S206). Accordingly, the data exchange unit 11c of the electronic whiteboard 1c receives the conference information transmitted from the communication management apparatus 5.

Next, the determination unit 15c determines a priority in processing of data that are shared with the electronic whiteboard 1a and the electronic whiteboard 1b based on the conference information received at the data exchange unit 11c (S207). Referring now to FIG. 22, processing of determining a priority in processing of data to be shared at the electronic whiteboard 1c is described. FIG. 22 is a flowchart illustrating example processing of determining a priority of data to be shared at the electronic whiteboard.

First, the determination unit 15c extracts a page ID indicated by the "current page" included in the conference information (S207-1). Next, the determination unit 15c identifies screen data of the page identified with the extracted page ID as data to be shared in high priority (S207-2). Here, the screen data identified at S207-2 is screen data constituting the drawing screen currently displayed on the electronic whiteboard 1a and the electronic whiteboard 1b. In this case, the determination unit 15c identifies, for example, the screen data of "page 4" identified with the page ID "page04" in the "current page" as the data to be shared in high priority.

Next, the determination unit 15c extracts a page ID indicated by "children" included in the conference information (S207-3). The determination unit 15c determines whether a plurality of page IDs are extracted at S207-3 (S207-4). When it is determined that a plurality of page IDs are extracted at S207-3 (YES at S207-4), the determination unit 15c proceeds to perform operation of S207-5. When only one page ID is extracted at S207-3 (NO at S207-4), the determination unit 15c ends the operation. That is, the determination unit 15c determines whether or not a page ID other than the page ID extracted at S207-1 has been extracted through the process of S207-3.

The determination unit 15c identifies a priority order of screen data of a plurality of pages, each identified with the page ID extracted at S207-4 (S207-5). In this example, a priority order of data items, other than the screen data determined to be shared in high priority, may be determined, for example, in an order that each screen data has been generated, or in an order of a size of screen data (for example, from smaller size to larger size). As described above, the determination unit 15*c* of the electronic whiteboard 1*c* identifies the screen data constituting the drawing screen currently displayed on the other electronic whiteboard 1 as data to be shared in high priority, from among a plurality of items of screen data.

Referring back to FIG. 20, the data exchange unit 11*c* of the electronic whiteboard 1*c* transmits, to the communication management apparatus 5, a page information acquisition request that requests acquisition of page information indicating screen data to be shared in high priority, as determined by the determination unit 15*c* (S208). The page information acquisition request includes a page ID for identifying the page of the screen data to be shared in high priority, which is identified by the determination unit 15*c*. In this case, the page information acquisition request includes the page ID "pag04". The page information acquisition request may include any other page ID ("pag01, pag02, pag03") associated with a priority order determined through processing of S207-5 of FIG. 22. The data exchange unit 51 of the communication management apparatus 5 receives the page information acquisition request from the electronic whiteboard 1*c*.

The storing/reading processing unit 59 of the communication management apparatus 5 searches the drawing screen information management DB 5006 (FIG. 11) using the page ID included in the page information acquisition request received at S208 as a search key, to read the page information associated with the page ID (S209). In this case, the storing/reading processing unit 59 reads data associated with the page ID "pag04", as page information. This page information includes a URL indicating the storage location of the background image data constituting the "page 4" identified by the page ID "pag04". The page information may include a URL of background image data constituting the page identified with any other page ID received at S208 (for example, "page 1", "page 2", "page 3"). The data exchange unit 51 transmits the page information read at S209 to the electronic whiteboard 1*c* (S210). Accordingly, the data exchange unit 11*c* of the electronic whiteboard 1*c* receives the page information transmitted from the communication management apparatus 5.

As illustrated in FIG. 21, the data exchange unit 11*c* of the electronic whiteboard 1*c* transmits download request information that requests downloading of background image data, to a URL indicating the storage location of the image storage device 7, which is received at S210 (S211). Thereby, the data exchange unit 71 of the image storage device 7 receives the download request from the electronic whiteboard 1*c*. Next, the storing/reading processing unit 79 of the image storage device 7 reads the requested background image data from the storage unit 7000 based on the URL received at S211 (S212). The data exchange unit 71 transmits the requested background image data to the electronic whiteboard 1*c* as the request source terminal (S213). Thereby, the data exchange unit 11*c* of the electronic whiteboard 1*c* downloads (receives) the background image data.

Further, the data exchange unit 11*c* of the electronic whiteboard 1*c* transmits request information indicating a request for downloading stroke data to the communication management apparatus 5 (S214). Thereby, the data exchange unit 51 of the communication management apparatus 5 receives the request information indicating the download request transmitted from the electronic whiteboard 1*c*. The storing/reading processing unit 59 of the communication management apparatus 5 searches the drawing screen information management DB 5006 (FIG. 11) using the page ID indicated by the page information received at S210 as a search key, to read stroke data associated with the page ID (S215). In this example, the storing/reading processing unit 59 reads stroke data whose page ID "pag04" is a parent. The data exchange unit 51 starts transmitting the stroke data read at S215 to the electronic whiteboard 1*c* (S216). Thereby, the data exchange unit 11*c* of the electronic whiteboard 1*c* starts downloading (receiving) the stroke data. The processing described referring to S211 to S213 and the processing described referring to S214 to S216 may be performed in any order other than the above-described order, or may be performed concurrently.

For example, as a download of background image data starts at S213, the download of the background image data reaches 50% at S216A, and 100% at S216D. As a download of stroke data starts at S216, the download of the stroke data reaches 25% at S216B, 50% at S216C, 75% at S216E, and 100% at S216F.

As described above, the electronic whiteboard 1*c* identifies screen data constituting a drawing screen currently displayed on other electronic whiteboards 1*a* and 1*b*, based on the conference information transmitted from the communication management apparatus 5, and starts downloading the identified screen data with high priority.

When a download of the background image data is complete, the data exchange unit 11*c* of the electronic whiteboard 1*c* receives, from the image storage device 7, a background image data transmission completion notification indicating that download of the background image data is complete. Further, when a download of the plurality pieces of stroke data is complete, the data exchange unit 11*c* of the electronic whiteboard 1*c* receives a stroke data transmission completion notification indicating that the download of the plurality of pieces of stroke data is complete. For example, the background image data transmission completion notification is transmitted in the same packet as the background image data. Alternatively, the background image data transmission completion notification may be transmitted in a different packet from a packet in which the background image data is transmitted. Similarly, for example, the stroke data transmission completion notification is transmitted in the same packet as the plurality of pieces of stroke data. Alternatively, the stroke data transmission completion notification may be transmitted in a different packet from a packet in which the plurality of pieces of stroke data is transmitted.

In response to reception of the stroke data transmission completion notification at the data exchange unit 11*c*, the image processing unit 16*c* of the electronic whiteboard 1*c* generates a stroke image for display on the display 180, based on the downloaded stroke data (S217). In this example, the image processing unit 16*c* generates a stroke image st4 (FIG. 19D) based on the stroke data corresponding to the downloaded "page 4".

When the data exchange unit 11*c* receives the background image data transmission completion notification and the stroke data transmission completion notification, the display control unit 14*c* displays, on the display 180, a background image based on the downloaded background image data and a drawing screen including the stroke image generated by the image processing unit 16*c* (S218). In this example, the display control unit 14*c* displays, on the display 180, a drawing screen 200*d* (FIG. 19D) including the background image v4 based on the background image data for the downloaded "page 4" and the stroke image st4 generated by the image processing unit 16c. Since the electronic whiteboard 1c preferentially displays a drawing screen currently displayed on the electronic whiteboard 1a and the electronic whiteboard 1b, a user of the electronic whiteboard 1c who participates in the remote conference part away is able to quickly know a topic currently discussed.

After downloading the background image data constituting the "page 4" screen data and the stroke data, the electronic whiteboard 1c downloads the rest of screen data according to the priority order determined through the processing described referring to FIG. 22. Alternatively, the electronic whiteboard 1c may download the rest of screen data concurrently with the "page 4" screen data.

Conventionally, when participating in a remote conference being conducted between a plurality of electronic whiteboards 1 part away, if many items of screen data such as background images have already been shared, it takes time for a user participating part away to share all data items. Further, it has been difficult for the user to understand the current topic. For example, it is assumed that four drawing screens as illustrated in FIGS. 19A to 19D are shared, and a drawing screen 200d (page 4) illustrated in FIG. 19D is currently displayed at an electronic whiteboard 1. If a user joins the remote conference part way, screen data will be shared with the electronic whiteboard of the user in sequence from the first page. This will take time to complete sharing of all items of data. Further, the user who joins the remote conference can hardly know that the content of the drawing screen 200d (page 4), which is currently displayed on other electronic whiteboard, is being discussed, thus making it difficult for the user to know the currently-discussed topic.

As described above, in one or more embodiments described above, the electronic whiteboard 1c, which is the electronic whiteboard of the user who participates part way, identifies screen data constituting a drawing screen currently displayed on other electronic whiteboards 1a and 1b, based on the conference information on the remote conference, managed by the communication management apparatus 5, and starts downloading the identified screen data with high priority. Accordingly, the electronic whiteboard 1c shares, with high priority, information of screen data (page) that constitutes a drawing screen currently displayed on other electronic whiteboard that is conducting the remote conference. The electronic whiteboard 1c shares information of screen data (pages) constituting any drawing screen that is not currently displayed at a later time. With this configuration, the user who joins part way is able to quickly know the currently-discussed topic, even when sharing of all data items are not completed. As a result, the communication system allows the electronic whiteboard 1c that participates in the remote conference part way to share data with other electronic whiteboard such as the electronic whiteboard 1a and the electronic whiteboard 1b more efficiently, thus facilitating smooth communication and improving efficiency in conducting conference.

Furthermore, the description given with reference to FIG. 20 to FIG. 22 is of the operation performed when background image data and stroke data generated during a remote conference conducted between the electronic whiteboard 1a and the electronic whiteboard 1b are shared with the halfway participating terminal (electronic whiteboard 1c). However, the operation illustrated in FIG. 20 to FIG. 22 is not limited to the operation for the communication terminal that is to join part way through the remote conference. For example, the operation illustrated in FIG. 20 to FIG. 22 can be performed to share background image data and stroke data displayed on the display 180 of the request source terminal (electronic whiteboard 1a) before or at the start of a remote conference with the destination terminal (electronic whiteboard 1b or electronic whiteboard 1c), to prepare for the remote conference. The request source terminal is any terminal that requests to start communication. In this case, at the time of establishing a communication session between the request source terminal and the destination terminal, the request source terminal uploads the background image data and the stroke data to the server system 6, and the destination terminal downloads the background image data and the stroke data uploaded to the server system 6.

Further, in one or more of the above-described embodiments, the electronic whiteboard 1c determines a priority of data to be shared. Alternatively, the communication management apparatus 5 may perform processing to determine a priority of data to be shared. In such case, the determination unit 53 of the communication management apparatus 5 uses the conference information read at S205 to execute processing to determine a priority of data to be shared as illustrated in FIG. 22. The storing/reading processing unit 59 of the communication management apparatus 5 searches the drawing screen information management DB 5006 (FIG. 11) using the page ID identifying a page of screen data to be shared with high priority as determined by the determination unit 53, as a search key, to read the page information associated with the page ID. The data exchange unit 51 of the communication management apparatus 5 transmits the page information that is read by the storing/reading processing unit 59 to the electronic whiteboard 1c. The data exchange unit 11c of the electronic whiteboard 1c downloads other screen data based on the received page information, as described above referring to processing after S211 of FIG. 21. Thereby, even when the communication management apparatus 5 identifies a priority of shared data, the communication system allows the electronic whiteboard 1c to share, with high priority, information of screen data (page) that constitutes a drawing screen currently displayed on other electronic whiteboard that is conducting the remote conference.

As described above, in one embodiment, the electronic whiteboard 1c according to the embodiment is an example of communication terminal that shares data with other communication terminals (for example, the electronic whiteboard 1a and the electronic whiteboard 1b). The electronic whiteboard 1c transmits a participation request for requesting participation in a remote conference with the other communication terminals to the communication management apparatus 5 that manages data shared between the other communication terminals. From among a plurality of items of screen data generated at at least one of the other communication terminals in the remote conference, the electronic whiteboard 1c receives screen data constituting a drawing screen (an example of display screen) displayed on the other communication terminals, from the communication management apparatus 5. The electronic whiteboard 1c controls the display 180 (an example of a display unit) to display the drawing screen based on the received screen data. Since the electronic whiteboard 1c preferentially downloads screen data constituting a drawing screen displayed on the other communication terminals, a user of the electronic whiteboard 1c can quickly participate in the remote conference to discuss the current topic, thus, facilitating smooth communication in the remote conference.

Further, in response to a participation request that requests participation in a remote conference with other communication terminals (for example, the electronic whiteboard 1a and the electronic whiteboard 1b), the electronic whiteboard 1c (an example of a communication terminal) identifies, from among a plurality of items of screen data generated at at least one of the other communication terminals, a drawing screen (an example of display screen) displayed at the other communication terminals, based on the conference information on the remote conference transmitted from the communication management apparatus 5. The electronic whiteboard 1c transmits a page information acquisition request (an example of a data acquisition request) requesting page information indicating the screen data constituting the identified drawing screen, to the communication management apparatus 5, to acquire the page information, which is transmitted from the communication management apparatus 5 in response to the page information acquisition request. As described above, the electronic whiteboard 1c identifies the drawing screen displayed on the other communication terminals based on the conference information managed by the communication management apparatus 5. Accordingly, the screen data constituting the drawing data currently displayed at the other communication terminals can be shared, with high priority, which relates to the currently-discussed topic in the remote conference.

Further, the electronic whiteboard 1c (an example of a communication terminal) according to the embodiment determines a priority order in downloading data corresponding to screen data, based on page identification information for identifying a plurality of items of screen data indicated by the conference information transmitted from the communication management apparatus 5. Accordingly, the electronic whiteboard 1c shares, with high priority, screen data that constitutes a drawing screen currently displayed on other electronic whiteboards. The electronic whiteboard 1c shares screen data constituting any drawing screen that is not currently displayed at a later time. With this configuration, the user of the electronic whiteboard 1c is able to quickly know the currently-discussed topic, even when sharing of all data items are not completed.

Further, the electronic whiteboard 1c (an example of a communication terminal) according to the embodiment controls the display 180 (an example of a display unit) to display a stroke image generated using downloaded stroke data and a background image generated using background image data. Since the electronic whiteboard 1c preferentially displays a drawing screen currently displayed on other electronic whiteboards 1, a user of the electronic whiteboard 1c is able to quickly know a topic currently discussed in the conference.

Furthermore, for the electronic whiteboard 1c (an example of a communication terminal) according to the embodiment, a plurality of items of screen data generated by other communication terminal in a remote conference corresponds to screen data shared between a plurality of other communication terminals (for example, the electronic whiteboard 1a and the electronic whiteboard 1b). The electronic whiteboard 1c shares, with high priority, screen data that constitutes a drawing screen currently displayed on other electronic whiteboards that are conducting the remote conference. Accordingly, a user of the electronic whiteboard 1c who participates in the remote conference halfway is able to quickly know a topic currently discussed in the conference, thus improving efficiency in conducting the conference.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), and field programmable gate array (FPGA), and conventional circuit components arranged to perform the recited functions.

Further, various tables of any one of the above-described embodiments may be generated by machine learning. Further, by classifying data of associated items, use of tables can be optional. In the present disclosure, machine learning is a technique that enables a computer to acquire human-like learning ability. Machine learning refers to a technology in which a computer autonomously generates an algorithm required for determination such as data identification from learning data loaded in advance, and applies the generated algorithm to new data to make a prediction. Any suitable learning method is applied for machine learning, for example, any one of supervised learning, unsupervised learning, semi-supervised learning, reinforcement learning, and deep learning, or a combination of two or more those learning.

Although the communication terminal, the communication system, the data sharing method, and the program stored in a non-transitory recording medium according to embodiments of the present invention are described above, the above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:
1. A communication terminal comprising circuitry configured to:
transmit a participation request for requesting participation in a remote conference being conducted between one or more other communication terminals, to a communication management apparatus that manages data being shared between the other communication terminals, the remote conference having already been started before the participation request is transmitted;
receive screen data of a display screen being currently displayed at the other communication terminals from the communication management apparatus, the screen data including a stroke data identifier identifying stroke data of the display screen currently being displayed and an image data identifier identifying background image data of the display screen currently being displayed, the screen data of the display screen being one of a plurality of items of screen data generated at at least one of the other communication terminals in the remote conference; and control a display to display the display screen based on the screen data that is received, wherein the circuitry is configured to:

download the stroke data identified with the stroke data identifier included in the screen data that is received, from the communication management apparatus, download the background image data identified with the image data identifier included in the screen data that is received, from a memory that stores the background image data, the memory that stores the background image data being separate from the communication management apparatus, and control the display to display a stroke image generated based on the stroke data, and a background image of the background image data.

2. The communication terminal of claim 1, wherein the circuitry is further configured to:

receive conference information on the remote conference from the communication management apparatus in response to the participation request;

identify the screen data of the display screen, based on the conference information on the remote conference;

transmit a data acquiring request for acquiring the screen data of the display screen to the communication management apparatus; and receive the screen data of the display screen, transmitted from the communication management apparatus in response to the data acquiring request.

3. The communication terminal of claim 2, wherein the circuitry is configured to identify the screen data of the display screen, using an identifier of a particular screen data of the plurality of items of screen data indicated by the conference information.

4. The communication terminal of claim 2, wherein the identifier of the particular screen data identifies a particular page of a plurality of pages of screen available for display at any one of the other communication terminals.

5. The communication terminal of claim 3, wherein the circuitry is configured to determine a priority in downloading the plurality of items of screen data, other than the identified screen data of the display screen, based on identifiers of the plurality of items of screen data indicated by the conference information.

6. The communication terminal of claim 1,
wherein the plurality of items of screen data are data having been or currently shared between the other communication terminals in the conference.

7. A communication system comprising:
the communication terminal of claim 1;
at least one of the other communication terminals; and
the communication management apparatus configured to manage communication between the communication terminal and the other communication terminals.

8. The communication system of claim 7,
wherein the other communication terminal is configured to transmit the background image data of a background image being displayed at the other communication terminal to store the background image data in the memory, and transmit stroke data generated at the other communication terminal to the communication management apparatus.

9. A method of sharing data, performed by a communication terminal, the method comprising:

transmitting a participation request for requesting participation in a remote conference being conducted between one or more other communication terminals, to a communication management apparatus that manages data being shared between the other communication terminals, the remote conference having already been started before the participation request is transmitted;

receiving screen data of a display screen being currently displayed at the other communication terminals from the communication management apparatus, the screen data including a stroke data identifier identifying stroke data of the display screen currently being displayed and an image data identifier identifying background image data of the display screen currently being displayed, the screen data of the display screen being one of a plurality of items of screen data generated at at least one of the other communication terminals in the remote conference; and displaying, on a display, the display screen based on the screen data that is received, wherein the receiving comprises:

downloading the stroke data identified with the stroke data identifier included in the screen data that is received, from the communication management apparatus, and downloading the background image data identified with the image data identifier included in the screen data that is received, from a memory that stores the background image data, the memory that stores the background image data being separate from the communication management apparatus, and wherein the displaying comprises:

controlling the display to display a stroke image generated based on the stroke data, and a background image of the background image data.

10. A non-transitory recording medium which, when executed by one or more processors, cause the processors to perform a method of sharing data comprising:

transmitting a participation request for requesting participation in a remote conference being conducted between one or more other communication terminals, to a communication management apparatus that manages data being shared between the other communication terminals, the remote conference having already been started before the participation request is transmitted;

receiving screen data of a display screen being currently displayed at the other communication terminals from the communication management apparatus, the screen data including a stroke data identifier identifying stroke data of the display screen currently being displayed and an image data identifier identifying background image data of the display screen currently being displayed, the screen data of the display screen being one of a plurality of items of screen data generated at at least one of the other communication terminals in the remote conference; and displaying, on a display, the display screen based on the screen data that is received, wherein the receiving comprises:

downloading the stroke data identified with the stroke data identifier included in the screen data that is received, from the communication management apparatus, and downloading the background image data identified with the image data identifier included in the screen data that is received, from a memory that stores the background image data, the memory that stores the background image data being separate from the communication management apparatus, and wherein the displaying comprises:
controlling the display to display a stroke image generated based on the stroke data, and a background image of the background image data.

11. A communication system comprising:
a communication terminal;
a plurality of other communication terminals; and
a communication management apparatus comprising circuitry configured to manage communication among the communication terminal and the plurality of other communication terminals and to manage data being shared among the communication terminal and the plurality of other communication terminals,
the communication terminal comprising circuitry configured to:
transmit a participation request for requesting participation in a remote conference being conducted between one or more of the plurality of other communication terminals, to the communication management apparatus, the remote conference having already been started before the participation request is transmitted;
receive screen data of a display screen being currently displayed at the other communication terminals from the communication management apparatus, the screen data including a stroke data identifier identifying stroke data of the display screen currently being displayed and an image data identifier identifying background image data of the display screen currently being displayed, the screen data of the display screen being one of a plurality of items of screen data generated at at least one of the other communication terminals in the remote conference; and
control a display to display the display screen based on the screen data that is received, wherein the circuitry of the communication terminal is configured to:
download the stroke data identified with the stroke data identifier included in the screen data that is received, from the communication management apparatus, download the background image data identified with the image data identifier included in the screen data that is received, from a memory that stores the background image data, the memory that stores the background image data being separate from the communication management apparatus, and
control the display to display a stroke image generated based on the stroke data, and a background image of the background image data.

12. The communication system of claim 11, wherein the circuitry of the communication terminal is further configured to:
receive conference information on the remote conference from the communication management apparatus in response to the participation request;
identify the screen data of the display screen, based on the conference information on the remote conference;
transmit a data acquiring request for acquiring the screen data of the display screen to the communication management apparatus; and
receive the screen data of the display screen, transmitted from the communication management apparatus in response to the data acquiring request.

13. The communication system of claim 12, wherein the circuitry of the communication terminal is configured to identify the screen data of the display screen, using an identifier of a particular screen data of the plurality of items of screen data indicated by the conference information.

14. The communication system of claim 12, wherein the identifier of the particular screen data identifies a particular page of a plurality of pages of screen available for display at any one of the other communication terminals.

15. The communication system of claim 13, wherein a priority is determined in downloading the plurality of items of screen data, other than the identified screen data of the display screen, based on identifiers of the plurality of items of screen data indicated by the conference information.

16. The communication system of claim 15, wherein the circuitry of the communication management apparatus is configured to determine the priority.

* * * * *